(12) United States Patent
Ali et al.

(10) Patent No.: US 7,396,311 B2
(45) Date of Patent: Jul. 8, 2008

(54) TRANSMISSION AND CONSTANT SPEED ACCESSORY DRIVE

(75) Inventors: Imtiaz Ali, Lathrup Village, MI (US); Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 90 days.

(21) Appl. No.: 11/353,426

(22) Filed: Feb. 14, 2006

(65) Prior Publication Data
US 2006/0154775 A1 Jul. 13, 2006

(51) Int. Cl.
*F16H 3/74* (2006.01)
(52) U.S. Cl. .................................... 475/257
(58) Field of Classification Search ............... 475/257, 475/346
See application file for complete search history.

(56) References Cited

U.S. PATENT DOCUMENTS

| | | | | |
|---|---|---|---|---|
| 2,901,924 A | | 9/1959 | Banker .................... 74/752 |
| 2,911,961 A | * | 11/1959 | McRae ................... 123/41.11 |
| 2,913,932 A | | 11/1959 | Oehrli ..................... 74/796 |
| 2,931,235 A | * | 4/1960 | Hayward .................... 476/1 |
| 2,959,070 A | * | 11/1960 | Flinn ....................... 74/664 |
| 3,327,566 A | | 6/1967 | Hewko ..................... 74/798 |
| 3,452,622 A | | 7/1969 | Kashihara ................. 74/796 |
| 3,481,220 A | * | 12/1969 | Kaptur ..................... 475/13 |
| 3,504,574 A | | 4/1970 | Okabe ...................... 74/796 |
| 3,641,842 A | | 2/1972 | Hewko ................... 74/665 K |
| 3,653,283 A | | 4/1972 | Betz ....................... 74/864 |
| 3,981,205 A | | 9/1976 | Avramidis et al. ..... 74/230.17 A |
| 4,020,711 A | | 5/1977 | Woollard ............... 74/230.17 E |

(Continued)

FOREIGN PATENT DOCUMENTS

GB 2130314 A 5/1984

(Continued)

OTHER PUBLICATIONS

970007 "Continuously Variable Accessory Drive System" Copyright 1997 Society of Automotive Engineers, Inc. by Shinji Yasuhara, Takao Tamagawa, and Yasuhiko Hasuda.
EAEC N. 91033 "Variable Accessory Drives—The Potential For Improving Fuel Consumption and Acceleration Performance" by A. Hedman—Chalmers University of Technology Gotborg (S).

*Primary Examiner*—Tisha D Lewis
(74) *Attorney, Agent, or Firm*—J. A. Thurnau, Esq.; C. H. Castleman, Esq.; J. L. Mahurin, Esq.

(57) ABSTRACT

An infinitely variable speed ratio planetary ball transmission comprising planetary members in rolling contact with moveable inner and outer races and a constant speed accessory drive system utilizing the transmission. The transmission is infinitely variable between ratios of approximately 0.3 and 1.0. A transmission input shaft is connected to a prime mover such as a vehicle engine crankshaft by a drive belt. The transmission comprises at least one output shaft that is coaxial with the input shaft. An output pulley is attached to the output shaft. A belt is engaged between the output pulley and various engine accessories. A second end of the transmission output shaft may be directly coupled to an engine accessory mounted on the transmission. An included control system senses a crankshaft speed. A processor analyses the crankshaft speed and accordingly adjusts the transmission ratio using a stepper motor connected to a worm drive to maintain a constant output speed regardless of crankshaft speed.

7 Claims, 18 Drawing Sheets

U.S. PATENT DOCUMENTS

| | | | |
|---|---|---|---|
| 4,061,045 A | 12/1977 | Kopp | 74/198 |
| 4,100,818 A | 7/1978 | Woollard | 74/230.17 E |
| 4,147,068 A | 4/1979 | Woollard et al. | 74/230.17 E |
| 4,216,678 A | 8/1980 | Butterfield et al. | 474/12 |
| 4,305,488 A | 12/1981 | McIntosh | 192/4 A |
| 4,310,321 A | 1/1982 | Peter et al. | 474/14 |
| 4,345,486 A | 8/1982 | Olesen | 74/198 |
| 4,557,032 A | 12/1985 | Wilson | 29/434 |
| 4,613,318 A * | 9/1986 | McWilliam et al. | 474/74 |
| 4,696,664 A | 9/1987 | Wilson | 474/138 |
| 4,730,516 A | 3/1988 | Kaneyuki | 74/752 D |
| 4,767,385 A | 8/1988 | Wilson | 474/138 |
| 4,854,921 A | 8/1989 | Kumm | 474/70 |
| 4,878,401 A | 11/1989 | Chung | 74/781 R |
| 4,969,857 A | 11/1990 | Kumm | 474/49 |
| 5,031,477 A | 7/1991 | Rayner | 74/665 |
| 5,066,266 A | 11/1991 | Kobayashi | 475/59 |
| 5,122,099 A | 6/1992 | Boedo et al. | 475/187 |
| 5,129,869 A | 7/1992 | Sagata et al. | 475/193 |
| 5,139,468 A | 8/1992 | Churchill et al. | 475/324 |
| 5,147,254 A * | 9/1992 | Baier et al. | 475/121 |
| 5,328,419 A | 7/1994 | Motl et al. | 475/324 |
| 5,378,210 A | 1/1995 | Teraoka | 475/312 |
| 5,557,977 A | 9/1996 | Stockton | 74/15.84 |
| 5,596,872 A | 1/1997 | Payne | 60/468 |
| 5,700,212 A | 12/1997 | Meckstroth | 474/70 |
| 5,709,624 A | 1/1998 | Donowski | 474/8 |
| 6,216,068 B1 | 4/2001 | Gimmler et al. | 701/36 |
| 6,379,275 B1 | 4/2002 | Serkh | 474/49 |
| 6,406,390 B1 | 6/2002 | Roby | 474/14 |
| 6,442,455 B1 | 8/2002 | Kotre et al. | 701/22 |
| 6,461,268 B1 | 10/2002 | Milner | 475/183 |
| 6,537,175 B1 | 3/2003 | Blood | 477/44 |
| 6,551,208 B1 | 4/2003 | Holmes et al. | 475/5 |
| 2003/0104900 A1 | 6/2003 | Takahashi et al. | 477/3 |
| 2005/0153813 A1* | 7/2005 | Serkh | 475/324 |

FOREIGN PATENT DOCUMENTS

| | | |
|---|---|---|
| GB | 2379250 A | 3/2003 |
| JP | 62199227 | 2/1989 |
| JP | 11351331 A * | 12/1999 |
| WO | WO 01/02751 A1 | 1/2001 |
| WO | WO 03/023256 A1 | 3/2003 |

* cited by examiner

TRANSMISSION AND CONSTANT SPEED ACCESSORY DRIVE

FIELD OF THE INVENTION

The invention relates to a transmission and to a constant speed accessory drive utilizing same, and more particularly, to a infinitely variable speed ratio planetary ball transmission having a plurality of planetary members in rolling contact with an inner and outer race and a belt driven constant speed accessory drive for operating engine accessories at a substantially constant speed.

BACKGROUND OF THE INVENTION

Vehicle engines generally comprise certain accessories that are used in the operation of the engine and vehicle. Such accessories can include a power steering pump, an air conditioning compressor, an alternator, an oil pump, a fuel pump and so on. These accessories are generally driven by a serpentine belt. The serpentine belt engages a pulley on each accessory as well as on an engine crankshaft. The engine crankshaft provides the torque to drive the accessories.

As the belt is driven by the crankshaft it is necessarily subject to engine speed variations during acceleration and deceleration of the vehicle. In other words the operating speed of the accessories is directly proportional to the speed of the engine. The variations in engine speed result in inefficient operation of the accessories because each accessory must be designed to operate satisfactorily over the entire engine speed range. This necessarily means that the efficiency is less than optimum for most of the speed range. Therefore it is desirable to decouple the accessories from the crankshaft so they can be driven at a constant, optimum speed.

Representative of the art is U.S. Pat. No. 4,969,857 to Kumm (1990) which discloses a variable speed accessory drive having a flat belt driving a variable diameter pulley wherein a fixed diameter pulley attached to the variable diameter pulley is used to drive another belt coupled to the accessories.

Also representative of the art is U.S. Pat. No. 4,305,488 to McIntosh (1981) which discloses a vehicle accessory drive assembly that incorporates a speed-increasing planetary gear set with an engine driven carrier input.

Kumm represents a particularly complex response to the problem, requiring many component parts in the CVT pulley which must operate in concert to perform properly. Further, Kumm will not operate with a multiple-ribbed belt which is the predominant driver in accessory drives.

A simple planetary ball continuously variable transmission is desirable to reduce possible failure modes for an accessory drive system as well as to increase durability.

Representative of the art is U.S. Pat. No. 6,461,268 B1 to Milner (2002) which discloses a continuously variable transmission of the type having planetary members in rolling contact with radially inner and outer races each comprising two axially spaced parts with control means for selectively varying the axial separation of the two parts of one race.

What is needed is a constant speed accessory drive that drives belt driven accessories at a substantially constant speed while using an infinitely variable speed ratio planetary ball transmission having a self locking drive. The present invention meets this need.

SUMMARY OF THE INVENTION

The primary aspect of the invention is to provide a constant speed accessory drive that drives belt driven accessories at a substantially constant speed while using an infinitely variable speed ratio planetary ball transmission having a self locking drive.

Other aspects of the invention will be pointed out or made obvious by the following description of the invention and the accompanying drawings.

The invention comprises an infinitely variable speed ratio planetary ball transmission comprising planetary members in rolling contact with moveable inner and outer races and a constant speed accessory drive system utilizing the transmission. The transmission is infinitely variable between ratios of approximately 0.3 and 1.0. A transmission input shaft is connected to a prime mover such as a vehicle engine crankshaft by a drive belt. The transmission comprises at least one output shaft that is coaxial with the input shaft. An output pulley is attached to the output shaft. A belt is engaged between the output pulley and various engine accessories. A second end of the transmission output shaft may be directly coupled to an engine accessory mounted on the transmission. An included control system senses a crankshaft speed. A processor analyses the crankshaft speed and accordingly adjusts the transmission ratio using a stepper motor connected to a worm drive to maintain a constant output speed regardless of crankshaft speed.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

The inventive system comprises a constant speed accessory drive (CSAD) that significantly reduces parasitic energy losses of driven accessories. The system results in significantly improved vehicle performance and drivability, including vehicle drive output torque and fuel economy improvements.

The system comprises an infinitely variable ratio planetary member transmission used in a belt driven engine accessory system that allows engine accessories to be operated at a substantially constant speed as the engine, and hence crankshaft, speed continuously varies. By maintaining the accessory belt drive at a minimum speed that meets all of the requirements of the vehicle, i.e., the minimum speed at which alternator delivers needed current and at which the air conditioner delivers required cooling, the system significantly reduces the accessory torque loads imposed on the engine. This makes more output torque available for vehicle propulsion, or, reduces the amount of throttle (power) needed to maintain the vehicle at a constant speed. An optimum situation is realized when the minimum accessory driven speed is less than the crankshaft speed, taking into account differences in the diameters of the respective accessory pulleys. In order to illustrate the advantages of the inventive CSAD system, vehicle acceleration and fuel consumption are described as indicative elements of performance.

Figure 1:
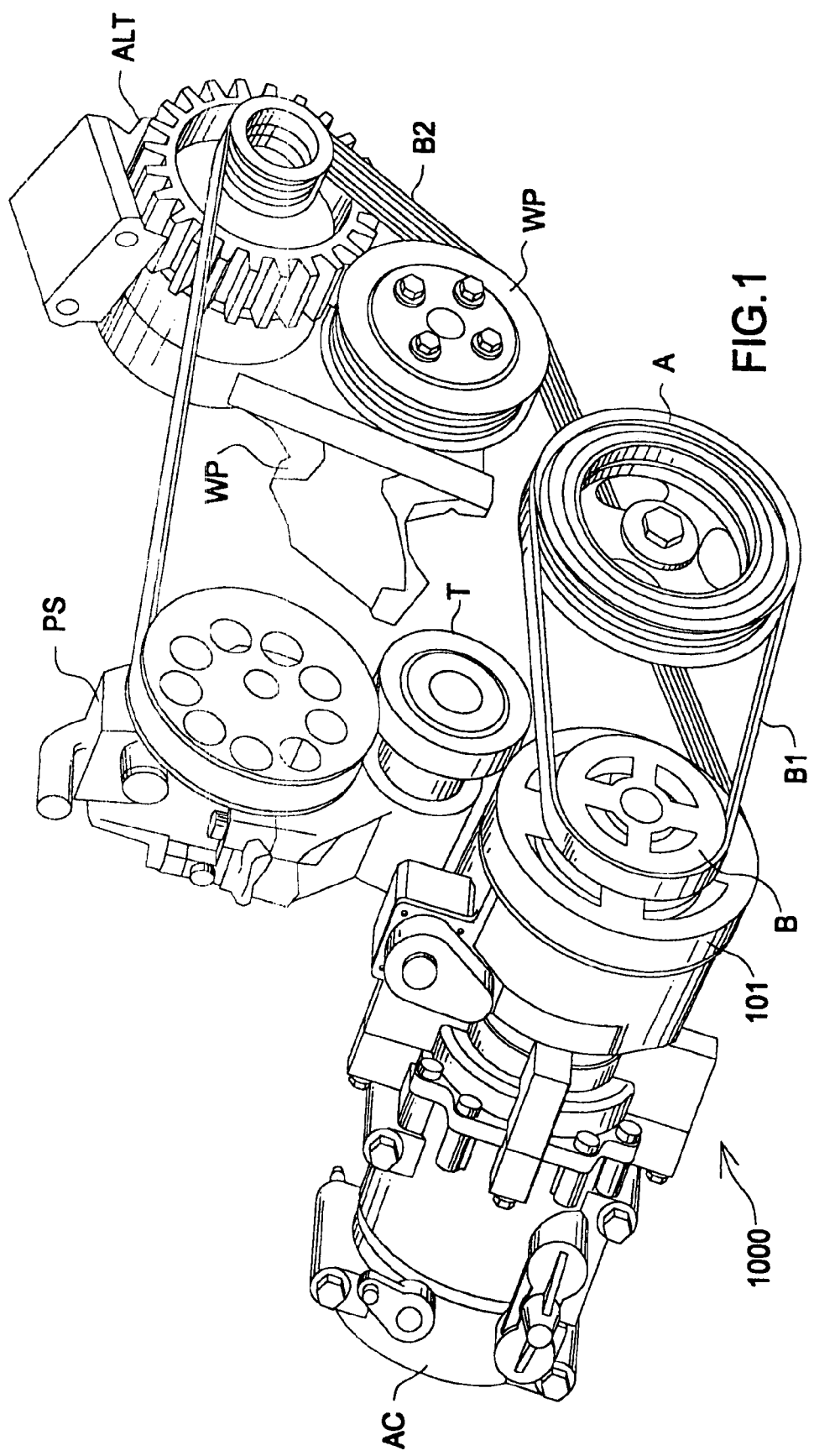
FIG. 1 is a schematic of a constant speed accessory drive system.

A general arrangement of the constant speed accessory drive system is shown in FIG. 1. Driver pulley (A) is connected to a prime mover such as the crankshaft of a vehicle internal combustion (IC) engine. The IC engine example is not offered as a limitation since the inventive system may be used in most any situation where it is desirable to control or vary a driven member speed with respect to a driver speed.

Driven pulley (B) is the input pulley 100 of an infinitely variable transmission 1000 of the type described herein. A first endless belt B1 is engaged between pulleys (A) and (B) thereby directly coupling the driver pulley to the driven pulley in a two point drive configuration. The speed of driven pulley (B) varies directly as the speed of the driver pulley (A) varies. Belt B1 may comprise any belt profile known in the art, including multiple-ribbed, v-belt and toothed.

Transmission 1000 drives various accessory pulleys by way of output pulley 101 that is connected by a second endless belt (B2) to driven accessories, including but not limited to an alternator (ALT), water pump (WP), and power steering pump (PS). Another accessory, namely an air conditioner (AC) compressor is shown directly connected to transmission 1000 and thereby to the output shaft of the transmission as described elsewhere in this specification. In an alternative arrangement the AC compressor need not be connected directly to the transmission and can be located elsewhere on the engine engaged with belt B2 as are the other accessories.

The disclosed drive arrangement decouples the crankshaft from the driven accessories, allowing the rotational speed of the accessories to be varied by the transmission independently of the crankshaft speed. Decoupling the accessories in this manner serves to increase the efficiency of the accessories and of the engine.

A belt tensioner T is used to tension belt B2 in order to facilitate torque transfer from the transmission output to the accessories. Tensioner T may also comprise damping, including asymmetric damping as known in the art.

The transmission mechanism described herein is extremely compact and highly efficient. The design eliminates any need for a pressurized hydraulic circuit for either lubrication or control of the transmission.

Description of the Infinitely Variable Ratio Transmission

Figure 2:
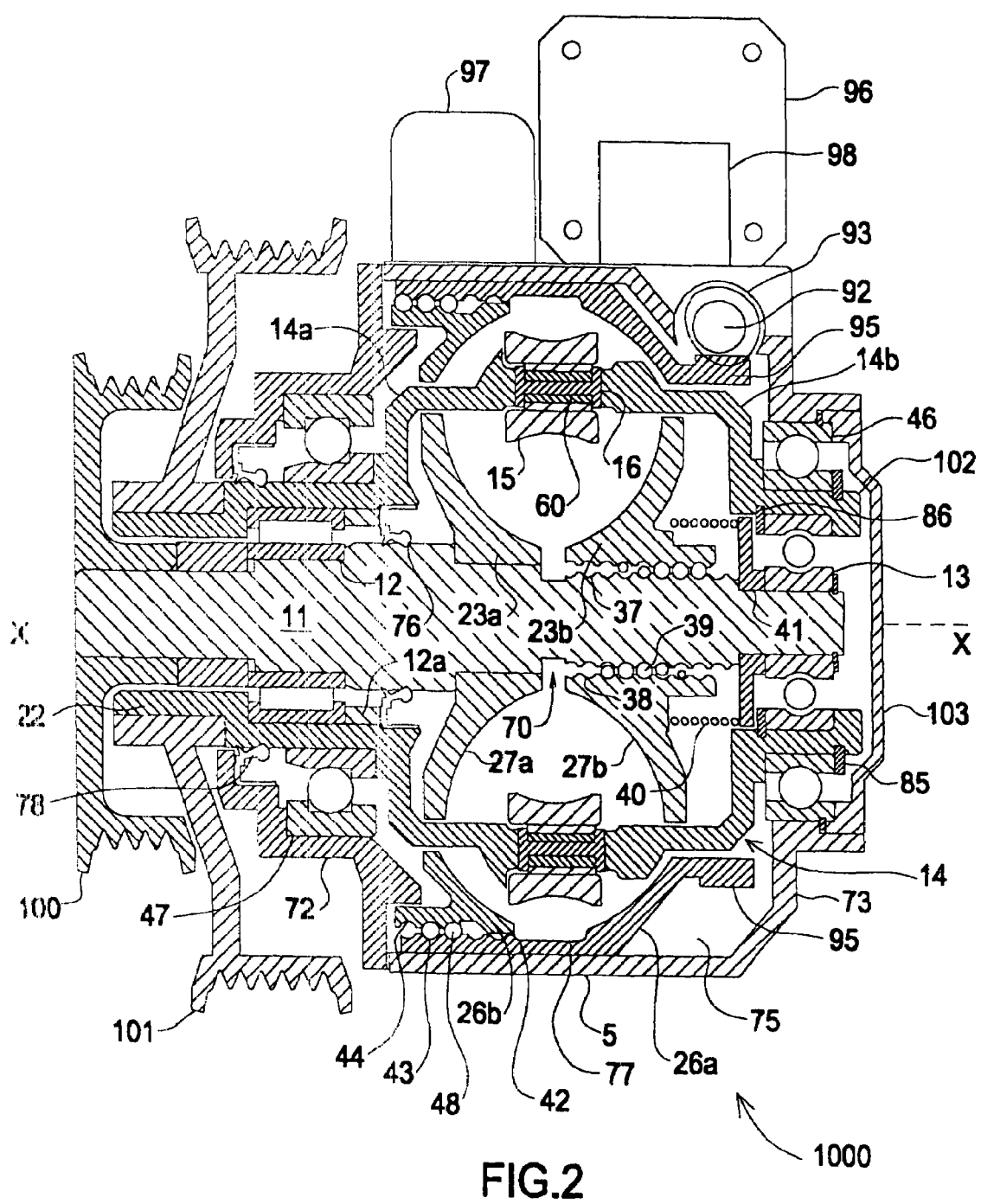
FIG. 2 is a cross-sectional view of the transmission.

In FIG. 2, a cross-sectional view of the transmission and its advantageous dual output features are shown. Transmission 1000 comprises a device of the type known generally as a continuously variable transmission (CVT). The transmission comprises planetary members in rolling contact with radially inner and outer races. Each race comprises two axially spaced parts or portions. Control means responsive to an engine speed are used to selectively vary an axial separation of the two parts of the outer race and thereby a radial position of the planetary ball members in rolling contact with the races. The variation in the radial position of the planetary members varies the output ratio and hence a rotational speed of the transmission output shaft.

Means sensitive to the torque applied to an input member of the transmission operates to determine a compensating variation in the separation of the two parts of the inner race and thus the ratio of the transmission. The torque sensitive means also varies the forces exchanged between the planetary members and the races, normal to the interface between them (N). The transmission is more fully described in U.S. Pat. No. 6,461,268 to Milner, the entirety of which disclosure is incorporated herein by reference.

The transmission depicted in FIG. 2, sometimes also referred to as a variator or infinitely variable transmission, comprises housing 5 within which is rotationally mounted a planet cage 14. Planet cage 14 comprises portions 14a and 14b. An input drive member comprising input shaft 11 is mounted coaxially within planet cage 14 on bearing 12 and bearing 13. Bearing 13 may comprise any suitable bearing known in the art, including but not limited to ball bearings and needle bearings. Snap ring 86 retains bearing 13 in planet cage portion 14b. Press fit ring 12a retains bearing 12 in plant cage portion 14a. Planet cage 14 is rotatably mounted within housing 5 on bearings 46, 47. Bearings (46,47) may comprise any suitable known in the art such as ball bearings or needle bearings. Snap ring 85 retains bearing 46 on planet cage portion 14b.

Planet cage portions 14a, 14b are joined together by shafts 16. Shafts 16 comprise studs, one end of which is press fit into portion 14a. The other end is cooperatively engaged with portion 14b and may comprise a press fit as well.

Seals (76, 78) contain the traction fluid within the transmission and prevent intrusion of foreign material into the transmission.

An axial cylindrical extension 22 of portion 14a constitutes one of two coaxial output drive members or shafts of the transmission. The other output shaft 102 is an axial extension of portion 14b. One can see that output shafts 22 and 102 rotate at the same speed since each is mechanically connected to planet cage 14.

Planet cage 14 is the means by which torque is transmitted from the input shaft 11 to the output shafts and pulley 101. To accomplish this, planet cage 14 further comprises four planet follower members 15 disposed symmetrically about the axis of input shaft 11 between the inner races (23a, 23b) and outer races (26a, 26b). Each planetary follower member 15 is rotatably borne by planet cage 14 on planet follower shafts 16. Each member 15 is rotatably borne upon each shaft 16 by needle bearings 60, or any other suitable bearing known in the art. Each follower 15 may move axially along each shaft 16 in response to a movement of each planetary member 25, see FIG. 3.

Figure 7:
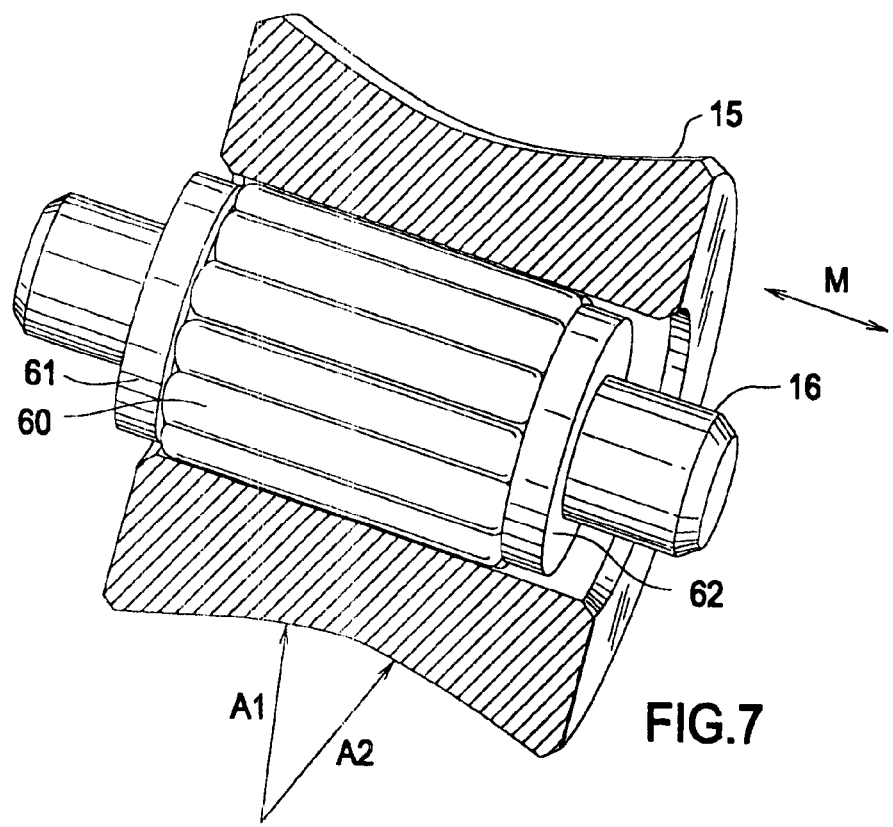
FIG. 7 is a cross section of a follower assembly.

Follower members 15 comprise a concave arcuate profile approximated by two truncated cone forms coaxially joined on a major axis of each, see FIG. 7. The conical form of each follower member provides an advantageous means of engaging a follower member with a spherical planetary member 25. Namely, the arcuate concave form provides two points of contact between the follower 15 surface and a planetary member 25 surface, thereby substantially decreasing engagement forces and thereby increasing durability under high loads as compared to a single point of engagement.

Turning now to the rotating assemblies, input shaft 11 comprises radially inner race which comprises two inner race parts 23a and 23b. Part 23a is formed as an integral part of shaft 11 or may also comprise a separate part that is press fit onto shaft 11. Parts 23a and 23b each comprise arcuate surfaces 27a and 27b respectively upon which planetary members 25 roll.

Figure 3:
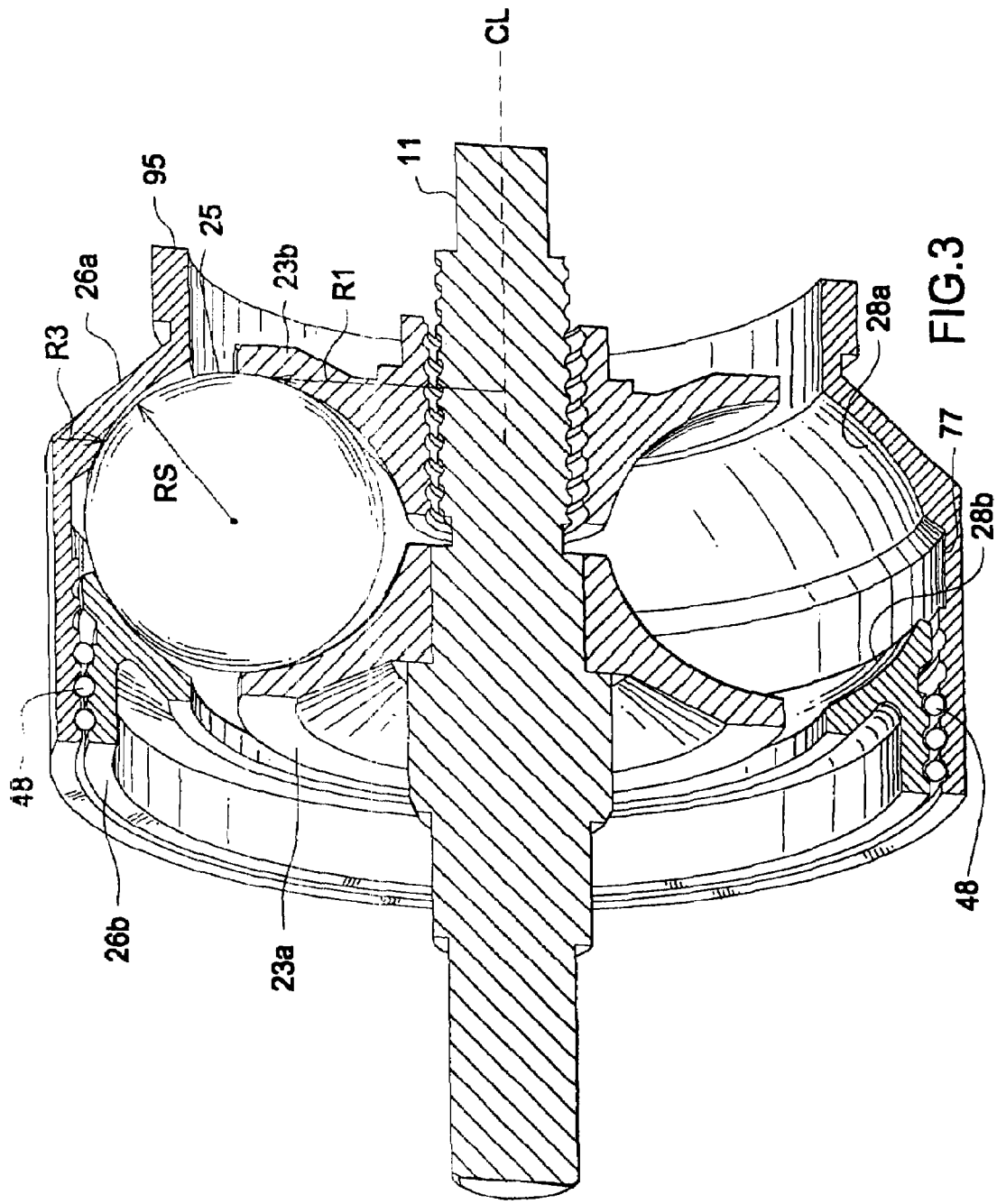
FIG. 3 is a partial cross section of the races showing a maximum drive ratio.

Part 23b is an adjustable member and is axially moveable along shaft 11 by a helical interengagement means comprising a ball screw threaded engagement, see FIG. 3. The ball screw comprises cooperating thread flights or helical channels 37 and 38 with rolling elements or balls 39 cooperatively disposed therein, see FIG. 10. Helical channels 37 and 38 and balls 39 can alternatively be replaced by a known threaded engagement, for example "ajax" or "acme" threads on part 23b and input shaft 11.

By virtue of the helical form of the channels 37, 38 a relative rotation of the input shaft 11 and part 23b in one directional sense will cause part 23b to be axially displaced towards part 23a. Axial separation of the two parts 23a, 23b of the inner raceway occurs where there is relative rotation between part 23b and input shaft 11 in the opposite directional sense.

Part 23b is held in continuous light contact with planetary members 25 by helical Interengagement means biasing member 40. Biasing member 40 comprises a torsional spring and has an end engaged with a limit on shaft 11 at member 41 and the other end engaged with part 23b. Spring 40 is under continuous compression so that part 23b is continuously urged axially along and upon shaft 11, resulting in a relative turning motion causing a relative axial displacement of part 23b, thereby causing continuous engagement of part 23b with planetary members 25.

Outer race 26 comprises axially separable annular race parts 26a, 26b. Outer race 26 comprises part 26a which has an axially extending cylindrical portion 42 within which the second of the radially outer race part 26b is rotatably engaged. Part 26a and part 26b are rotationally connected by a helical interengagement means, the combination comprising means for selectively varying the axial separation of the race parts. Namely, an inner surface of the cylindrical portion 42 has a helical channel 43. Radially outer race part 26b is an adjustment member and has on its outer cylindrical surface a helical channel 44. Rolling elements or balls 48 having a rolling engagement are disposed between channel 43 and channel 44 allowing outer race part 26b to rotate with respect to portion 42. Channel 43, channel 44 and balls 48 together form a ball screw. Channels 43, 44 have a pitch coarse enough to effect timely ratio changing between extremes without requiring excessive travel of the ratio change worm gear, see FIG. 9, while not being so coarse that the contact conditions simply force the races apart. Channels 43, 44 and balls 48 may also be replaced with a threaded engagement, including "ajax" or "acme" threads. An angular movement or rotation of outer race part 26b with respect to part 26a to effect a full ratio change is approximately 150°.

Planetary members 25 roll along the rolling tracks of the race members. Rolling tracks of the inner race parts 23a, 23b and outer race parts 26a, 26b, respectively identified 27a, 27b and 28a, 28b each comprise, ill cross-section, a partially-circular arcuate surface the radius of which is slightly greater than the radius (RS) of each spherical planetary member 25.

The difference in radius between each planetary member 25 and tracks 27a, 27b, 28a, 28b causes a theoretical point engagement between each member 25 and each track. A radius of curvature of surface 27a and 27b can be selected to give a desired rate of ratio change based upon a rate at which the members 25 move radially during such ratio change.

The contact patches between members 25 and surfaces 27a, 27b, 28a, 28b should not be too large in order to avoid so-called spin loss resulting from forces developing in the hydrodynamic fluid between the two elements in rolling contact. Disposed between parts 23a and 23b is gallery 70 which provides a return flow path for traction fluid circulating among members 25 and the inner and outer races.

Through operation of the actuator and worm drive, axial approach of the two outer race parts 26a, 26b controls the radial position of the planetary members by applying pressure to the planetary members 25 thereby causing them to move radially inwardly toward input shaft 11 thereby urging the two inner race parts 23a, 23b apart. This changes the output ratio of the transmission. Torsion spring 40 assures continuous engagement of race part 23b with members 25. Of course, outer race parts 26a and 26b may also move apart, thereby causing the planetary members to move radially away from input shaft 11, thereby allowing parts 23a and 23b to move axially toward each other through operation of the torque sensitive means.

Race part 26a rotates within indentations in housing 5 while moving in an axial direction which is parallel to axis X-X for ratio changes. Axis X-X is the common axis of rotation of the transmission, including the input shaft 11, the inner and outer raceways 23, 26, the output shafts 22, 102, as well as being the center of the orbital path of the spherical planetary members 25. Race part 26b engages housing 5 in such a manner so as to prevent rotation of part 26b with respect to housing 5, but in a manner to otherwise allow axial movement of part 26b toward or away from part 26a as part 26a rotates.

The transmission also possesses an inherent one-way clutching action based on the operation of the torque sensitive mechanism. During high deceleration rates where the component inertia torques are enough to overcome the friction and load torques, the normal output will become the driver in the transmission. This causes the clamping force on the inner race 23b to be reduced and an overrunning condition will exist.

Housing 5 comprises a somewhat rectangular form in cross section. Studs 71 connect housing side 72 and housing side 73 with housing 5 using nuts 74, see FIG. 8. Cooling fins (CF) extending from the outer surface of the housing 5 may be used to cool the transmission and traction fluid.

Housing 5 comprises reservoir 75 which receives and contains the traction fluid for the transmission. The traction fluid system is unpressurized and instead operates at an ambient pressure condition. Cage 14 rotates partially submerged in the traction fluid contained in reservoir 75. The traction fluid is swept up into the rotating portions of the transmission during operation. The traction fluid provides the required coefficient of friction between the planetary members or balls and the race surfaces. The fluid flows around the planetary members and exits the outer race through gap 77 and inner race through gap 70. The traction fluid also cools the transmission.

The traction fluid can comprises any of those suitable for the service known in the art, which includes Santotrac® 50 or Santotrac® 2500. Each fluid is a low viscosity synthetic hydrocarbon based traction fluid used where medium to high film strength is desirable. The fluids are available from Findett Corporation, 8 Governor Drive, St. Charles, Mo. 63301.

Figure 11:
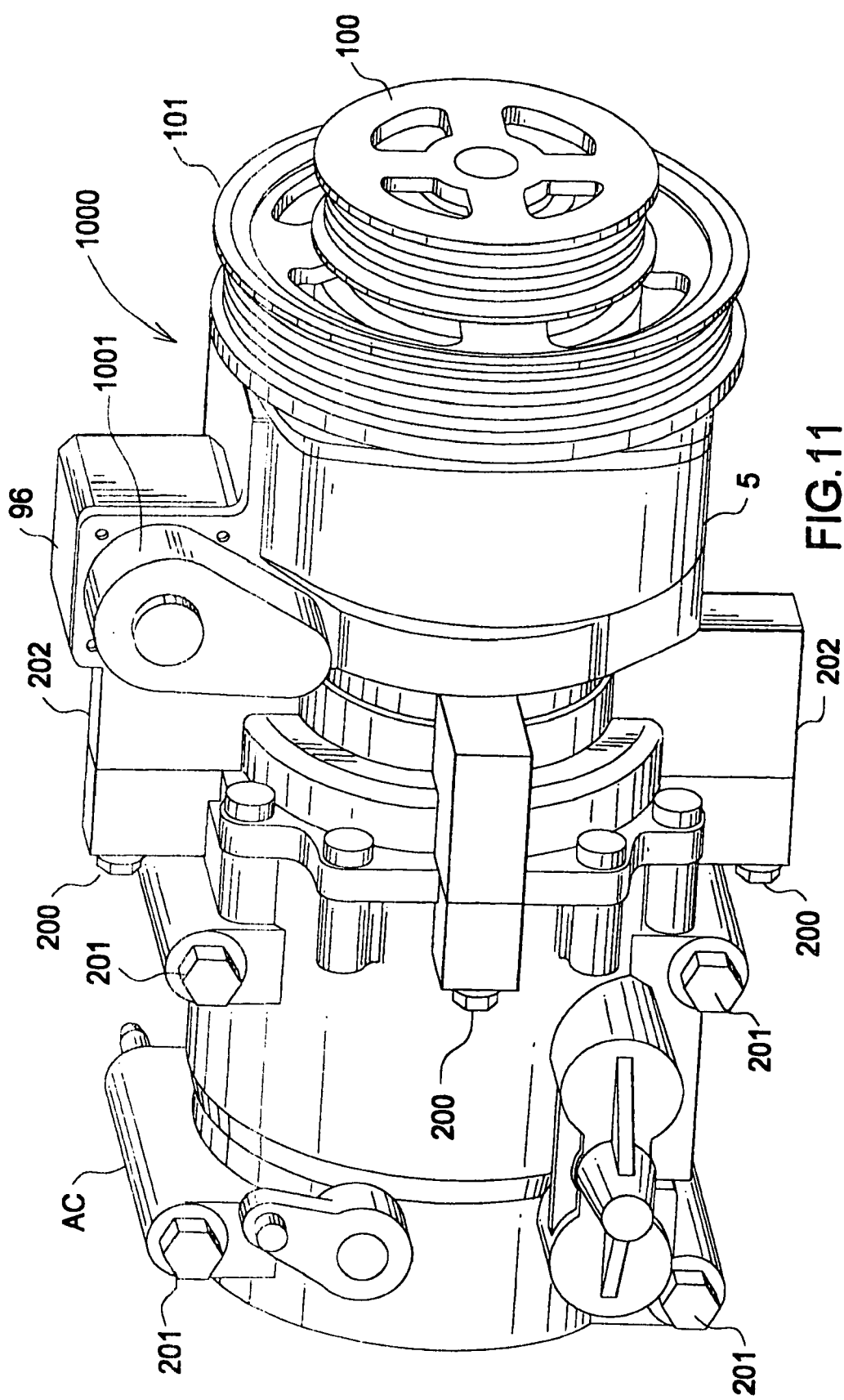
FIG. 11 is a perspective view of the tandem embodiment.

Housing 5 further comprises means for mounting to an engine, see FIG. 11.

Although this description includes an automotive oriented constant speed accessory drive system, it should be understood that the inventive transmission can be used in any application requiring a transmission disposed between a driver and driven equipment. In these cases the driver may be directly coupled to the input shaft 11 of the transmission as well as by belt and pulley. The inventive transmission can be used, for example and not by way of limitation, in vehicle or motorcycle driveline applications such as transmissions, as well as slurry pumps, water pumps, air and gas compressors, HVAC, air handling equipment, bulk material handling pumps, and so on. In each case the equipment is driven by a primary driver such as an electric motor or internal combustion engine. The transmission is disposed between the motor or engine and the driven equipment or driveline. The continuously variable feature of the transmission allows infinite and accurate speed control of the driven equipment speed. The inventive transmission provides the advantage of offering the widest possible range of speed ratios for a drive system requirement as compared to a gear type transmission. Further, the dual output feature of the transmission allows two pieces of equipment to be driven by a singe transmission while utilizing a single driver. If a belt drive with a transmission output, then multiple pieces of driven equipment can be driven at different speeds.

Description of Operation.

In operation, input drive shaft 11 is driven by belt B1 engaged with pulley 100. Rotation of the input drive shaft 11 causes inner race 23 to rotate and carry with it on surfaces 27*a* and 27*b*, by rolling contact, the planetary members 25 which roll upon the curved surfaces 28*a* and 28*b* of outer race 26. Planetary members 25 are constrained by their contact with the curved surfaces 27*a*, 27*b* and 28*a*, 28*b* of the radially inner and radially outer races 23, 26 respectively. Since inner race part 23*a* is fixed in position with respect to shaft 11, all radial and axial movements of the spherical members 25 is defined by and in reference to part 23*a*. Hence the path followed by a center of each member 25 describes a curve that matches the arcuate shape of surface 27*a*.

The mechanism operates as a torque-sensitive means which allows compensating rotary and axial movement of the movable inner race part 23*b* with respect to fixed race part 23*a*. The torque sensitive means comprises biasing member 40 and helical interengagement means 37, 38, 39, acting to react the forces exerted by the transmission of drive forces between the radially inner race 23 and the planetary members 15. The torque sensitive means acts both to determine the compensating variation in the separation of the parts of the inner race 23 and thus the transmission ratio of the device, and to vary the forces exchanged between the planetary members 15 and the races normal to the interface between them.

Put another way, the torque sensitive helical interengagement means reacts a direct circumferential force and an axial force having a circumferential component. The circumferential component of the axial force is substantially equal to and opposite in sign from the direct circumferential force reacted by the helical interengagement. This minimizes the force required to be applied to the control means for selectively varying the axial separation of the two axially spaced parts of the outer race to maintain or change a transmission ratio of the transmission.

Each planetary member 25 is also rotationally engaged with a follower member 15. Planetary motion of the members 25 is conveyed to the follower members 15 and, via the shafts 16, to the planet cage 14 which is in turn connected to output shafts 22 and 102. Since members 25 move both radially and axially with respect to shaft 11 during ratio changes of the transmission each follower member 15 is also slightly moveable axially on bearings 60 in a direction parallel to axis X-X so that proper contact with each member 25 is maintained through the entire range of motion of each.

Ratio change of the transmission is effected by variation in the relative approach or separation of the radially outer race parts 26*a*, 26*b*. This is caused by rotation in one direction or the other of outer race part 26*a* by worm drive 90. Rotation of outer race part 26*a* causes a greater or lesser force to be applied to the planetary members 25 urging them radially inwardly toward inner race 23. As the two outer race parts 26*a*, 26*b* are brought together the forces exerted on the planetary members 25 increases. The radially inward force applied to inner races 23*a*, 23*b* urges them apart caused by relative rotation of race part 23*b* with respect to shaft 11 through operation of the balls 39 in the channels 37, 38.

Race part 23*b* rotates at the same speed as race part 23*a* apart from a minor transient variation when relative movement over a limited arc takes place for compensating adjustment of the pressures applied by the planetary members 25. More particularly, rotation of shaft 11 in the intended direction of drive causes the race part 23*b* to approach part 23*a* axially when resisted by drag so that any play in the rolling contact between the races and the planetary members 25 is taken up until the forces exerted on the helical interengagement by race part 23*b* and the drive shaft 11 matches the reaction forces between the race part 23*b* and the planetary members 25. At this point no further axial displacement of the race part 23*b* relative to race part 23*a* takes place.

A transmission ratio is determined by the radial position of the race part 26*a* and in turn, of planetary members 25. The function of the inner race threads 37, 38 and balls 39 is to maintain the ratio of normal to tangential (tractive) force (n/f) of each planetary member 25 contact point within a certain range. The ratio must be large enough to ensure that excessive slip does not occur (at least n/f=10 for partial lubrication and up to twice that for full hydrodynamic lubrication) but not so large that a significantly greater normal force (N) is applied than is needed, which would reduce efficiency, torque capacity and life of the unit.

A spherical planetary member 25 shape is well suited for this role because such a planetary member is in equilibrium under the action of four peripheral contact radial 'squeezing' forces applied by the races in the plane of FIG. 2 (the y direction) and a driving force through the member center normal to the plane of the drawing (the z direction), as here, y/z has the same value wherever on the periphery the contact points may be. This means that the inner and outer race y/z values are equal for any ratio setting of the transmission. Torsion spring 40 acting on an inner race 23*b* provides sufficient preload to ensure that there is always enough contact pressure for the torque sensitive mechanism to function as the torque increases from zero.

Housing 5, with end portions 72 and 73, contains the variable transmission unit in its entirety with the exception of the input and output shafts and worm drive, rendering the overall package very compact. Hence, the invention is very suitable, for example, for the transmission for a constant speed accessory drive. For use in an accessory belt drive system an output from transmission 1000 comprises a multiple-ribbed pulley on output shaft 22. Another output shaft 102 extends coaxially opposite shaft 22. Shaft 102 can also be directly coupled to an accessory, such as an air conditioner compressor, see FIG. 11. The combination of the transmission, mounting bracket and attached accessory comprise a complete assembly that is mountable as a single unit on a vehicle engine. Of course, the air conditioner compressor (A/C) is only offered as an example and any other accessory may be mounted to the transmission as well, including without limitation a power steering pump, alternator, fuel pump, oil pump, water pump, as well as any other accessory.

It should be noted that the input and output members may have their respective functions reversed, that is, the input may be received through shaft 22 and the output transmitted out through shaft 11. This results in an increase in the output torque over the input torque. Hence, the transmission may be operated in either rotational torque transmitting direction.

In the race configuration illustrated in FIG. 3 the radius of rolling contact (R1) between the members 25 and the inner raceway 23 is relatively large and the radius of contact (R3) between the members 25 and the outer raceway 26 is relatively small. In this configuration the transmission ratio between the input shaft 11 and output shaft 22, 102 is approximately 1.0. As described elsewhere in this specification, the radius of rolling contact is controlled by the relative position of parts 26a and 26b. The axial position of part 26b is controlled by worm drive 90, see FIG. 9. Action of worm drive 90 on part 26a axially moves part 26b by partially rotating part 26a about shaft 11 in either a clockwise or counterclockwise direction.

Figure 4:
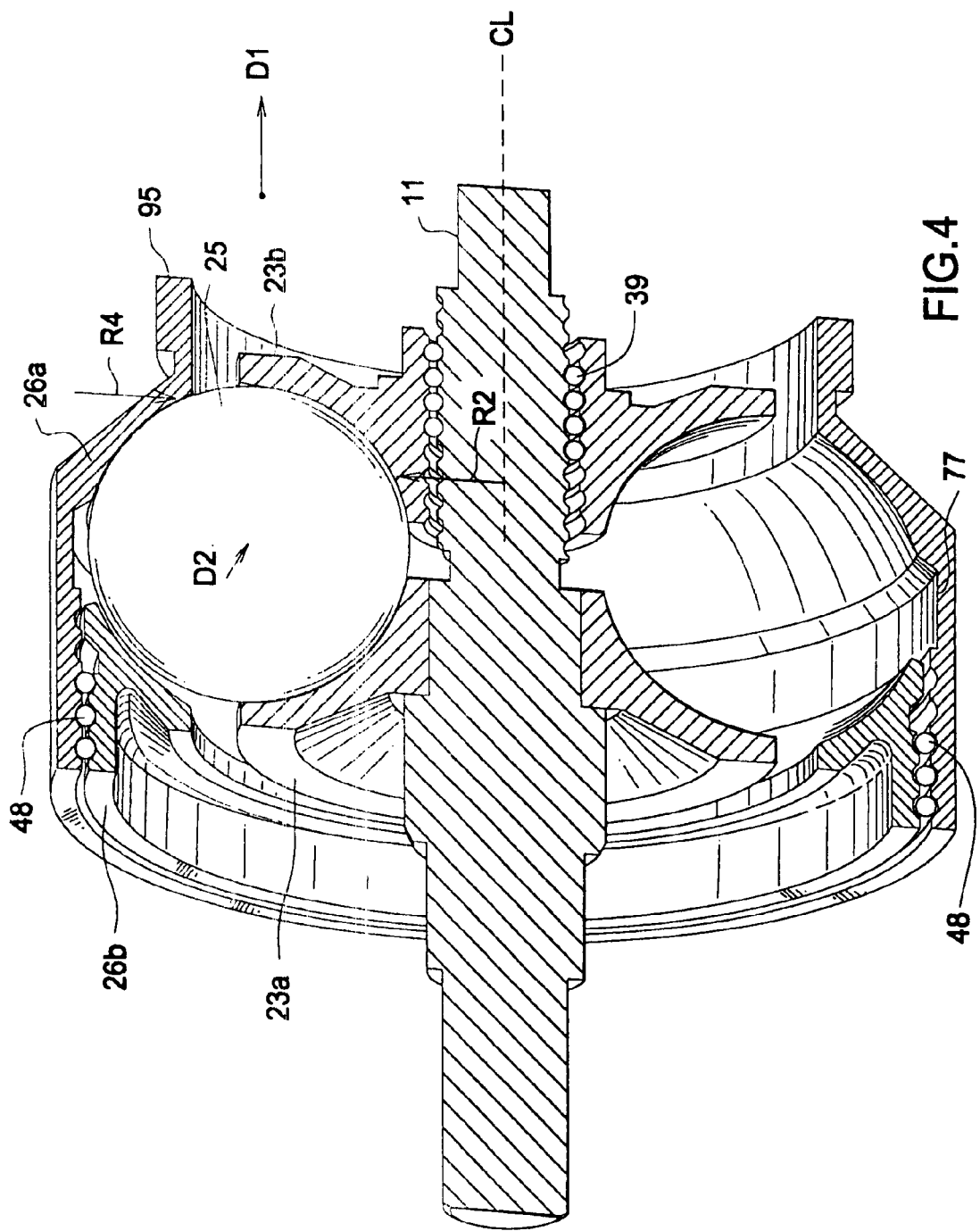
FIG. 4 is a partial cross section of the races showing a minimum drive ratio.

Referring to FIG. 4, by operation of worm drive 90 in an opposite direction from that illustrated in FIG. 3, race part 26b moves axially toward part 26a as part 26a rotates so that the members 25 are forced to move radially inwardly. Movement of members 25 is compensated by axial approach of the inner race part 23b toward part 23a as caused by action of torsion spring 40 bearing on part 23b. In this configuration the radius of rolling contact (R2) between the members 25 and the inner race 23 is relatively small and the radius of contact (R4) between the members 25 and the outer race 26 is relatively large. In this configuration, the transmission ratio between the input shaft 11 and output shaft 22, 102 is approximately 0.3.

Since inner race part 23a does not move, the members 25 roll on surface 27a and thereby follow the contour of surface 27a. The center of each member 25 moves approximately in direction D2, displacing radially inwardly and axially simultaneously as the ratio is changed from FIG. 3 to FIG. 4.

The input/output ratio is also subject to the relative diameters of the input 100 and output 101 pulley, thereby adding another dimension of variability to the inventive system. For example, the diameter of output pulley 101 may be matched to cooperate with the diameter of each of the accessory pulleys. Properly selecting the diameter of each pulley in the system allows the desired rotational speed to be realized for each accessory for a corresponding engine crankshaft speed. The differing pulley ratios are enhanced by the infinitely variable characteristic of the transmission.

Figure 5:
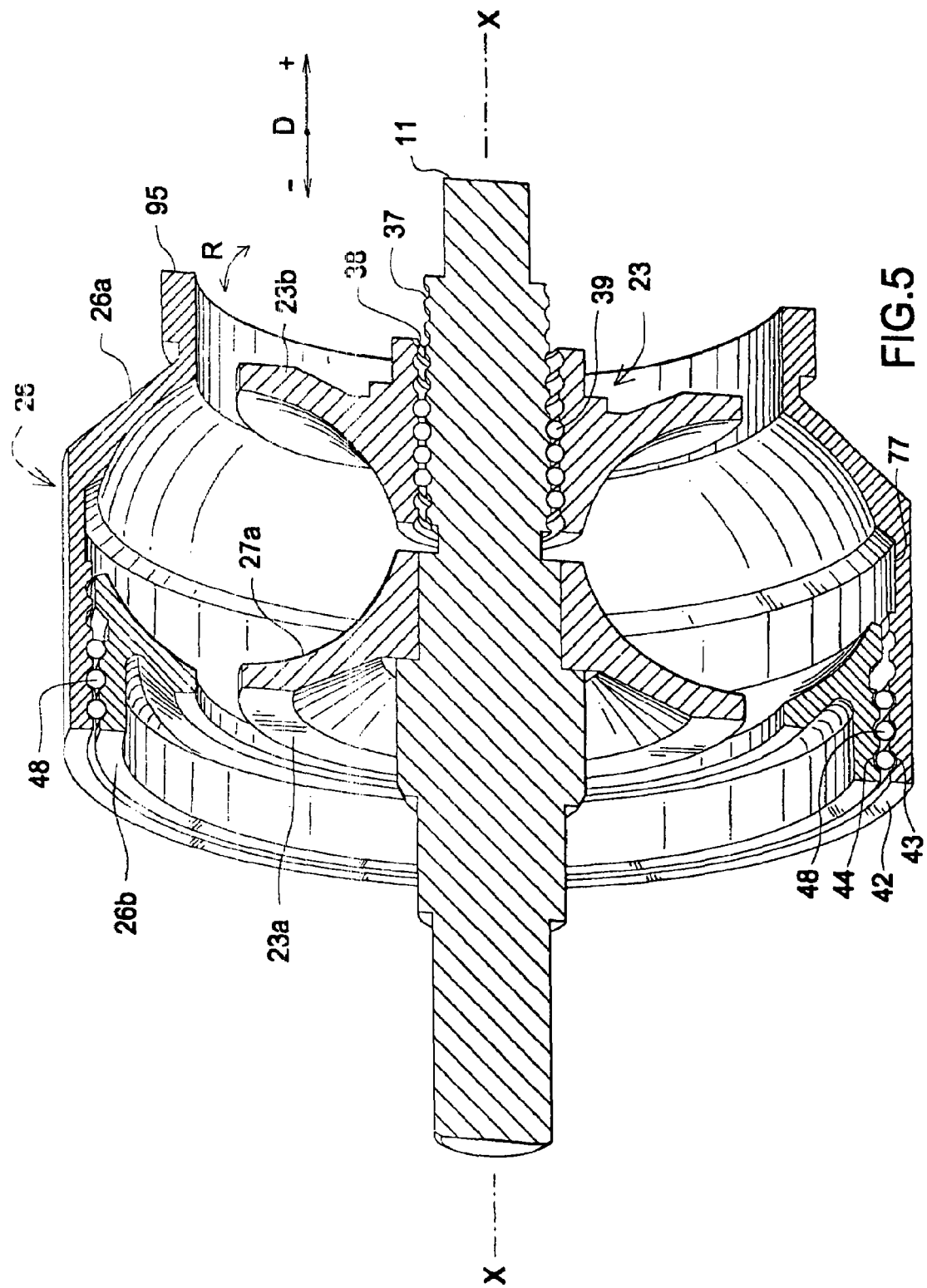
FIG. 5 is a partial cross section of the races.

FIG. 5 is a cross sectional perspective view of the shaft and races. Inner race 23 and outer race 26 are shown. Inner race part 23b moves in directions ±D by rotating about input shaft 11 on the ball screw (37, 38, 39). Outer race part 26b moves in directions ±D as well by virtue of rotation of outer race part 26a in direction R on ball screw 43, 44, 48, see FIG. 10. Fluid gallery 77 provides a path for circulating traction fluid to leave the cage and race area and return to reservoir 75. The axis of rotation of the transmission is noted by X-X.

Figure 6:
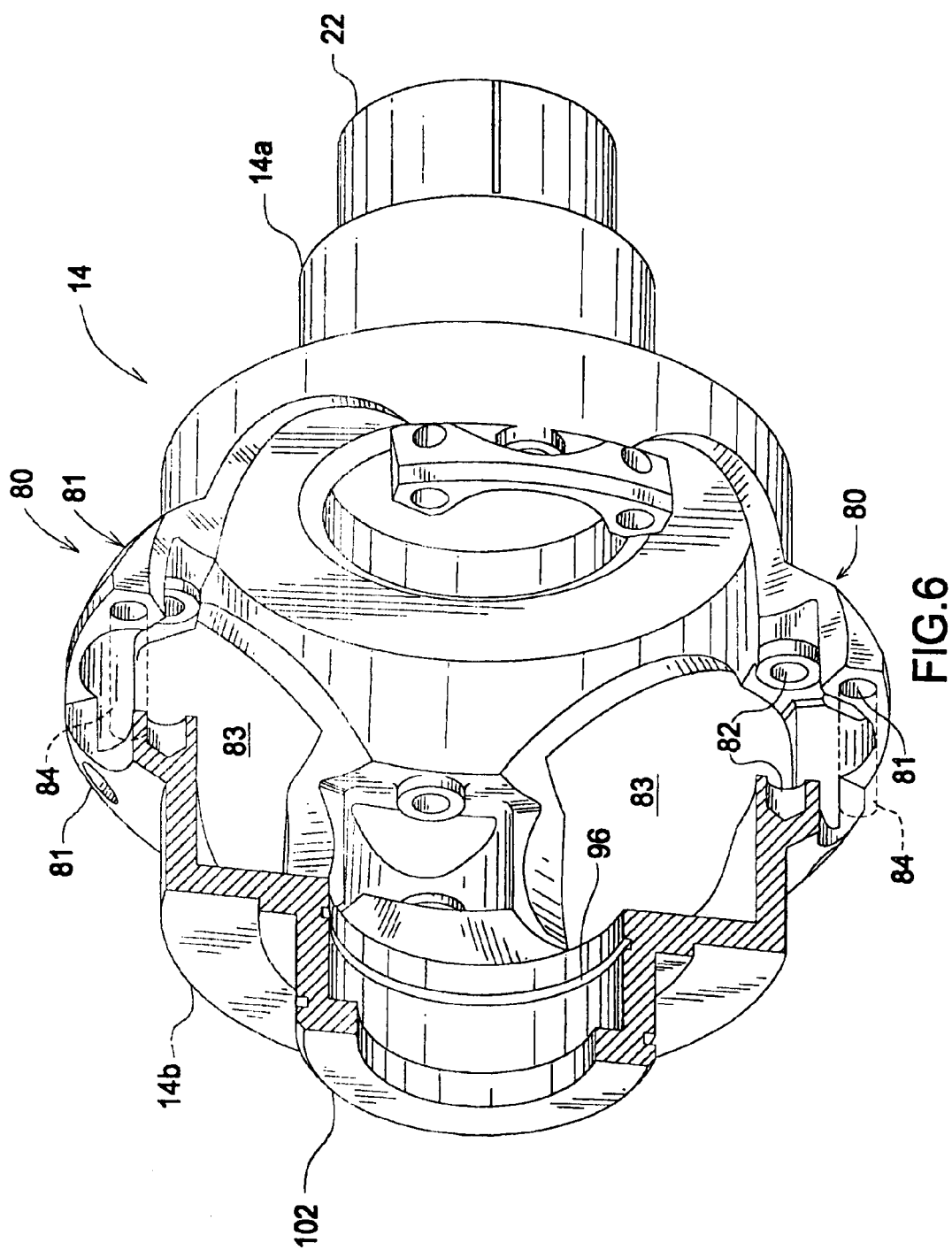
FIG. 6 is a partial cross section of the cage.

FIG. 6 is a partial cross sectional view of the cage. Cage 14 comprises cage portion 14a and cage portion 14b. Follower brackets 80 are disposed symmetrically about cage 14. Each shaft 16 is connected to a bracket 80, and thereby cage 14, in holes 82. Dowel pins 84 disposed in holes 81 are used to properly align cage portions 14a and 14b. A planetary member 25 rolls within a respective space 83. Spaces 83 are symmetrically disposed about cage 14 between follower brackets 80. Snap ring 86 engages portion 14b in groove 96. Output shafts 22 and 102 extend from cage portion 14a and 14b respectively.

FIG. 7 is a cross sectional view of the follower assembly. Follower 15 comprises an arcuate form having a cross section which is approximated by two truncated cones joined point to point. This results in a substantially concave cross section having radii A1 and A2 which engage members 25. Radius A1 can be equal to or greater than radius A2. This form is advantageous because it affords two points of contact with each ball 25 and follower 15. This provides improved efficiency and accuracy for torque transfer. It also reduces the loading from a single point to two points without significantly increasing rolling friction losses. In order to follow each member 25 as a ratio is changed, follower 15 is slightly moveable axially in direction M on needle bearings 60 along shaft 16. Needle bearings 60 are contained between shoulders 61, 62 on shaft 16. Shoulders 61, 62 for containing bearing 60 may comprise snap rings known in the art as well. Follower 15 is shown axially displaced on shaft 16.

Figure 8:
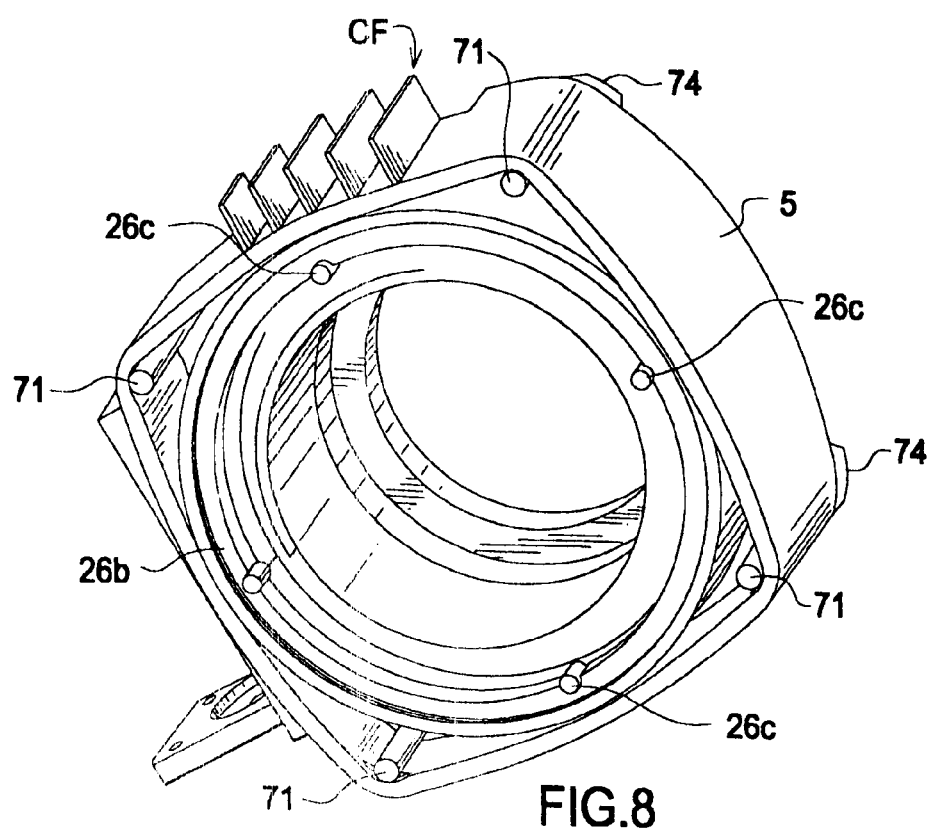
FIG. 8 is a detail of the housing and outer race.

FIG. 8 is a detail of the housing and outer race. Housing 5 comprises sections 72, 73. Outer race part 26b is shown with dowels 26c. Dowels 26c engage holes in housing section 72. Race part 26b is freely moveable in an axial direction (with respect to axis X-X) upon dowels 26c as outer race part 26a is rotated by worm drive 90. Dowels 26c constrain outer race part 26b from rotating as part 26a rotates.

Studs 71 and nuts 74 hold housing sections 72 and 73 together. Cooling fins CF are mounted to an outer surface of housing 5 and radiate heat from the transmission.

Figure 9:
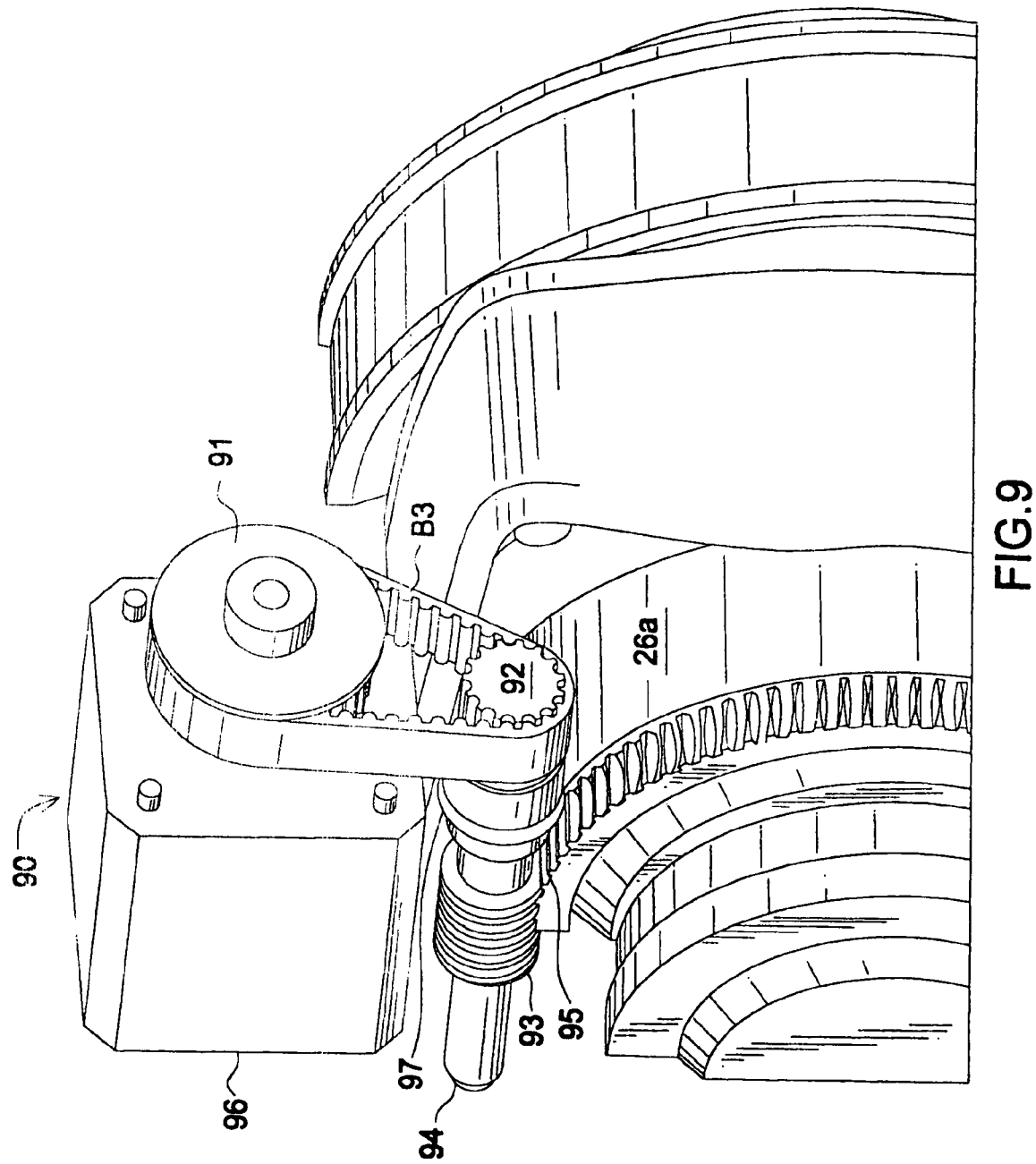
FIG. 9 is a detail of the outer race drive.

FIG. 9 is a detail of the race drive. Worm drive 90 is attached to housing 5 using known means for example studs, bolts or screws. Worm drive 90 comprises a DC stepper motor 96. By way of example and not of limitation a suitable stepper motor is manufactured by LIN Engineering, model number 4218L-01. The step motor can be viewed at www.linengineering.com/our products/4218.htm. Other stepper motors known in the art may be used as well. Stepper motor controller 97 is known in the art as well and may be obtained from LIN Engineering or other suitable supplier.

Sprocket 91 is connected to the output shaft of the motor 96. By way of example, sprocket 91 comprises 30 teeth and a pitch diameter of 28.65 mm. A cooperating sprocket 92 is attached to the worm drive pinion 94. By way of example, sprocket 92 has 15 teeth and a pitch diameter of 14.32 mm. Hence, the drive ratio in this non-limiting example is 2:1. Toothed belt B3 is entrained between sprocket 91 and 92 and comprises 45 teeth and a 3 mm pitch, for a total pitch length of 135 mm.

Worm gear 93 is machined into the drive pinion 94. A cooperating worm gear track 95 is machined into the outer race part 26a. An exemplary worm gear set is available from W. M. Berg at www.wmberg.com, stock number WCS-7S. For example, worm 93 comprises a single thread with a pitch diameter of 12.0 mm, a lead of 3.14159 mm, a lead angle of 4.75 degrees, and a pressure angle of 14.5 degrees. The pitch diameter of worm gear 95 is 88 mm and comprises 88 teeth. Thus, the module is 1.0. The helical angle is 4.75 degrees, the pressure angle is 14.5 degrees and the circular pitch is 3.14159 mm. The center distance of the worm gear set will be 50.00 mm (½ of (88+12)) and the ratio is 88:1.

A frictional component is created between the pinion 94 and bearing in housing 5, namely, pinion 94 axially engages a frictional member comprising a thrust washer 97 in housing 5, see FIG. 2. Thrust washer 97 has a coefficient of friction on its engagement surface with pinion 94. The frictional force created by the engagement between washer 97 and pinion 94 resists rotation of the pinion during operation, but more particularly, it prevents rotation of the pinion when it is desirable that the worm and hence outer race remain motionless and hence axial displacement of the race part is restrained, for example, for a steady state engine speed and hence steady state transmission operating condition. In such a steady state condition motor 96 is deactivate. The frictional counter surface for thrust washer 97 is the aluminum housing 5.

Thrust washer 97 can be made of steel. It may also comprise a coating or over-molded friction surface on a steel insert.

Grease or light oil can be used for a non-coated steel thrust washer. In this case the coefficient of friction of the steel only washer is approximately 0.9-1.1. In the case where it is necessary to reduce the coefficient of friction below that of steel the following thermoplastic materials can be used (by way of example and not of limitation): Arlen AE 4200 (Mitsui Petrochemical), Lubricomp 189 (LNP Engineered Plastics). The coefficient of friction for the thermoplastic materials is approximately 0.06 to 1.0. Oil or grease is not used with the thermoplastic materials.

In the case where it is necessary to increase the coefficient of friction above that of steel the following thermoplastic materials can be used (by way of example and not of limitation): Lubriloy RL (LNP Engineered Plastics), TEP 642 (Thomson Industries). The coefficient of friction using these materials is approximately 0.14 to 1.20. Oil or grease is not used with these thermoplastic materials.

Any of the foregoing thermoplastic materials can be molded over the steel washer insert or may be used without a steel insert.

The described mechanical and frictional configuration results in the worm drive being self-locking when the motor 96 is not in operation. The torque provided by the motor 96 need only be sufficient to overcome the frictional force between washer 97 and pinion 94 and the radial force of the members 25 to thereby cause rotation of the outer race part 26a. Once the outer race is moved to a desired position, and hence transmission output ratio, motor 96 is deactivated. The frictional characteristic of the worm drive then prevents further rotation (and axial movement) of the outer race 26a by operation of the self-locking pinion.

Figure 10:
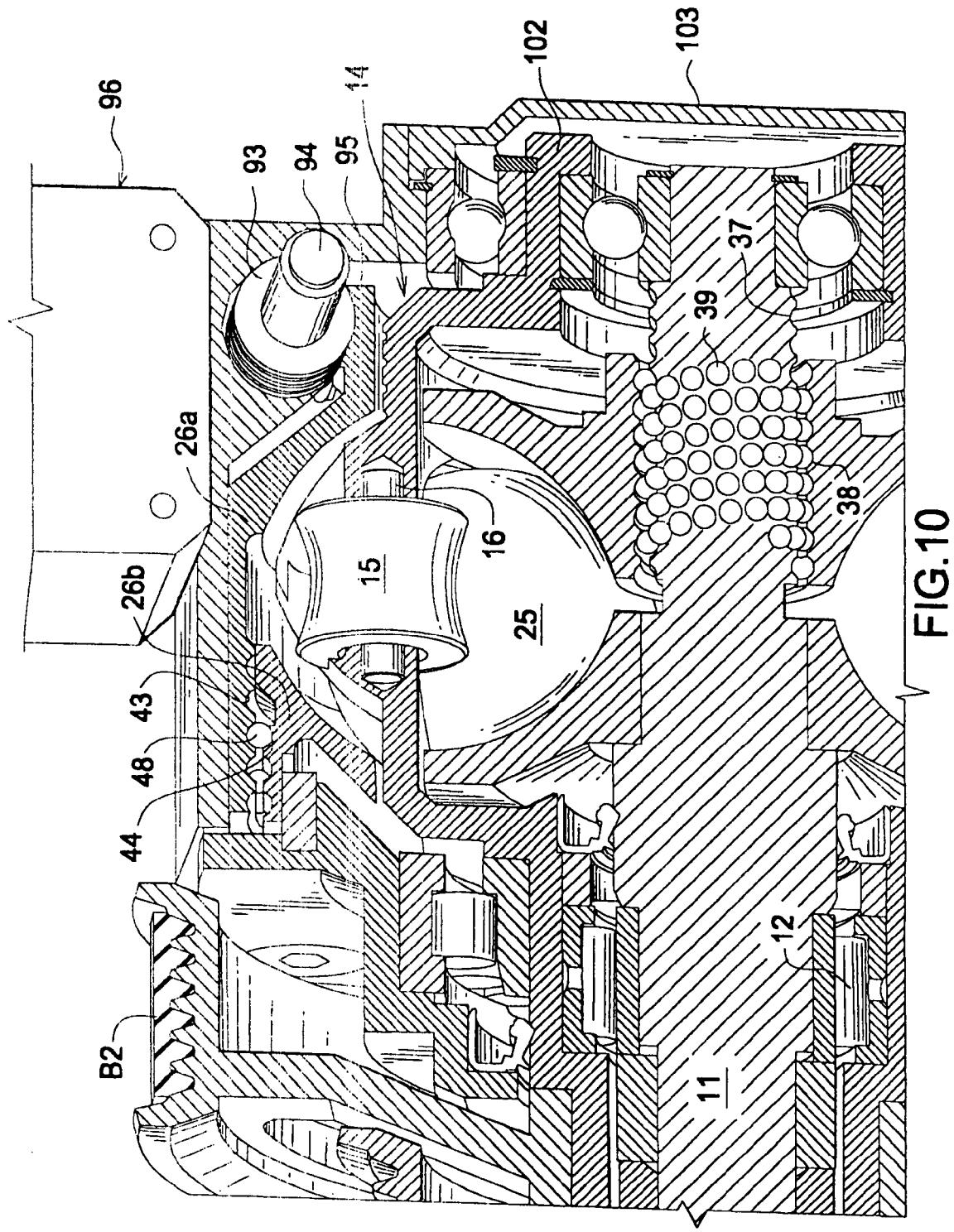
FIG. 10 is a cross-sectional view of the transmission.

FIG. 10 is a cross-sectional view of the transmission. Referring also to FIG. 2 and FIG. 9 the inner ball screw comprises cooperating helical channels 37 and 38 with balls 39 cooperatively disposed therein. For example and not by way of limitation, the ball screw comprises a pitch diameter of 18 mm, a lead of 9.57 mm and a ball diameter of 2.65 mm. The helix angle is 9.61 degrees. The ball screw comprises three starts. The number of balls per start is 37 for a total number of 111 balls. The axial length over balls is 21.5 mm.

As described elsewhere in this specification, outer race part 26b moves in direction ±D by rotating within outer race part 26a in direction R on ball screw 43, 44, 48, see FIG. 5. The ball screw has a pitch diameter of 107 mm, a lead of 16.01 mm and a ball diameter of 3.00 mm. The helix angle is 2.73 degrees and has 4 starts. The number of balls per start is 15. The total number of ball screw balls is 60. The axial length over balls is 8.4 mm.

Pinion 94 is engaged in housing 5. Motor 96 is mounted directly to housing 5 by means known in the art, such as by studs, bolts or screws. Splash lubrication by the traction fluid is provided to both ball screws by rotation of planet cage 14.

FIG. 11 is a cross-sectional view of the tandem embodiment. In this example arrangement, air conditioning compressor AC is directly coupled to transmission 1000. An input clutch of AC is directly connected to output shaft 102, see FIG. 12. Fasteners 200 known in the art, for example, bolts, studs or pins, are used to attach AC to housing 5 of transmission 1000. Housing members 202 receive fasteners 200. Fasteners 201 connect AC to an engine block. Fasteners 201 comprise studs, bolts or screws or any other suitable fastener known in the art.

In this embodiment dust cover 103 as shown in FIG. 10 is removed from the transmission to allow direct connection of the AC input clutch to shaft 102.

Dust cover 1001 protects belt B3 from debris.

Figure 12:
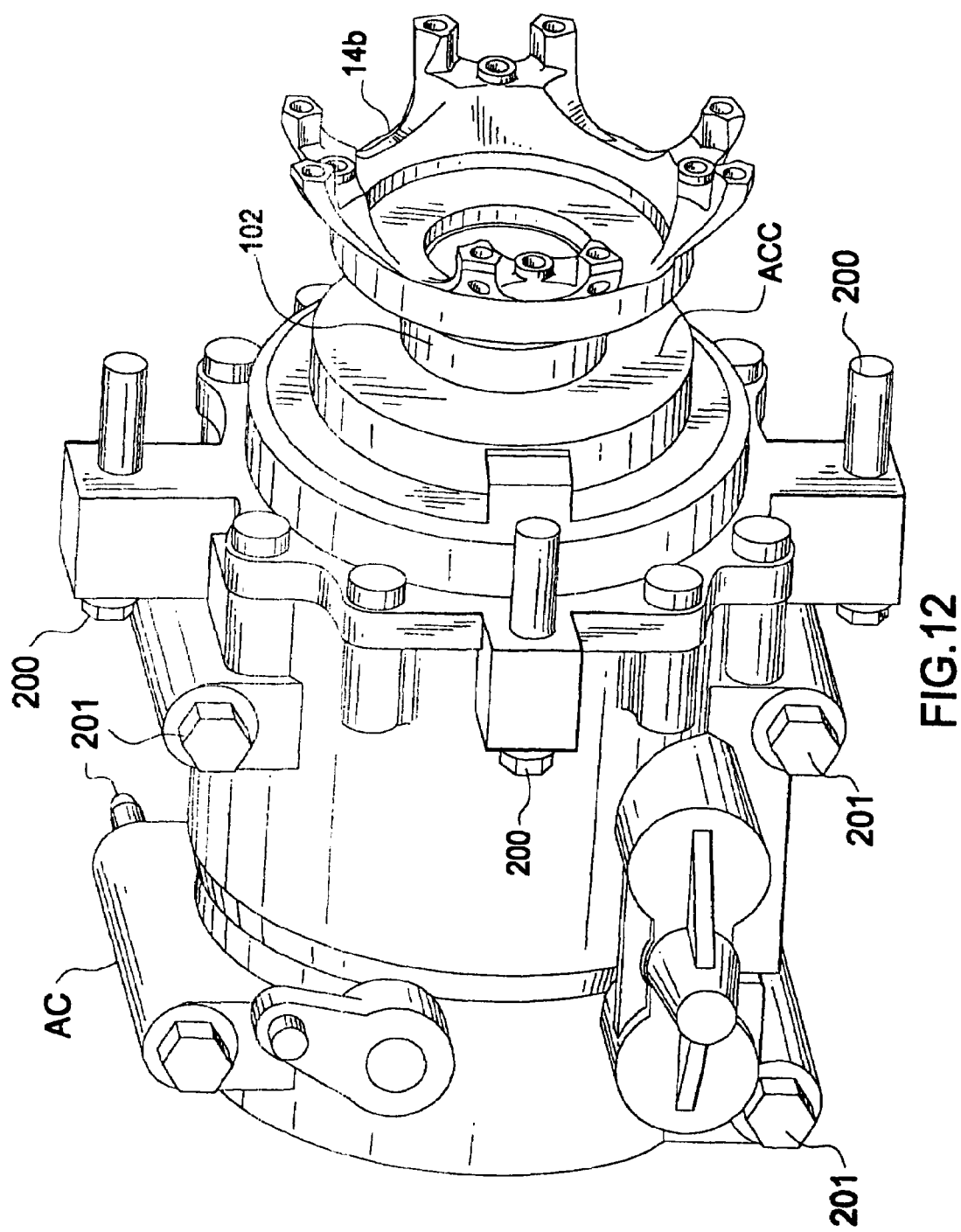
FIG. 12 is a partial perspective view of the tandem embodiment.

FIG. 12 is a partial perspective view of the tandem embodiment. The majority of transmission 1000 is deleted from this view with the exception of cage portion 14b and shaft 102. Shaft 102 of cage portion 14b is shown directly connected to the air conditioner compressor input clutch ACC. The air conditioner compressor operates at the same speed as output shaft 102. However, the air conditioner compressor does not necessarily operate at the same speed as the driven accessories. The speed of the AC compressor is a function of the diameter of the crankshaft pulley A and transmission input pulley 100 and the transmission ratio. Hence, the speed of the compressor directly coupled as shown is determined in part by the diameter of the input pulley 100. On the other hand, the other accessories shown in FIG. 1 are driven by output pulley 101, which diameter can also be selected to give a desired accessory speed that is different or the same as the air conditioner compressor speed based on the diameter of each of the accessory pulleys. Hence, the tandem accessory arrangement allows two independent accessory speeds; one speed being that of the output shaft 102 and the other being a function of the pulley ratios between pulley 101 and the various individual accessory pulley diameters. This provides broad variability for system optimization.

Figures 13, 14:
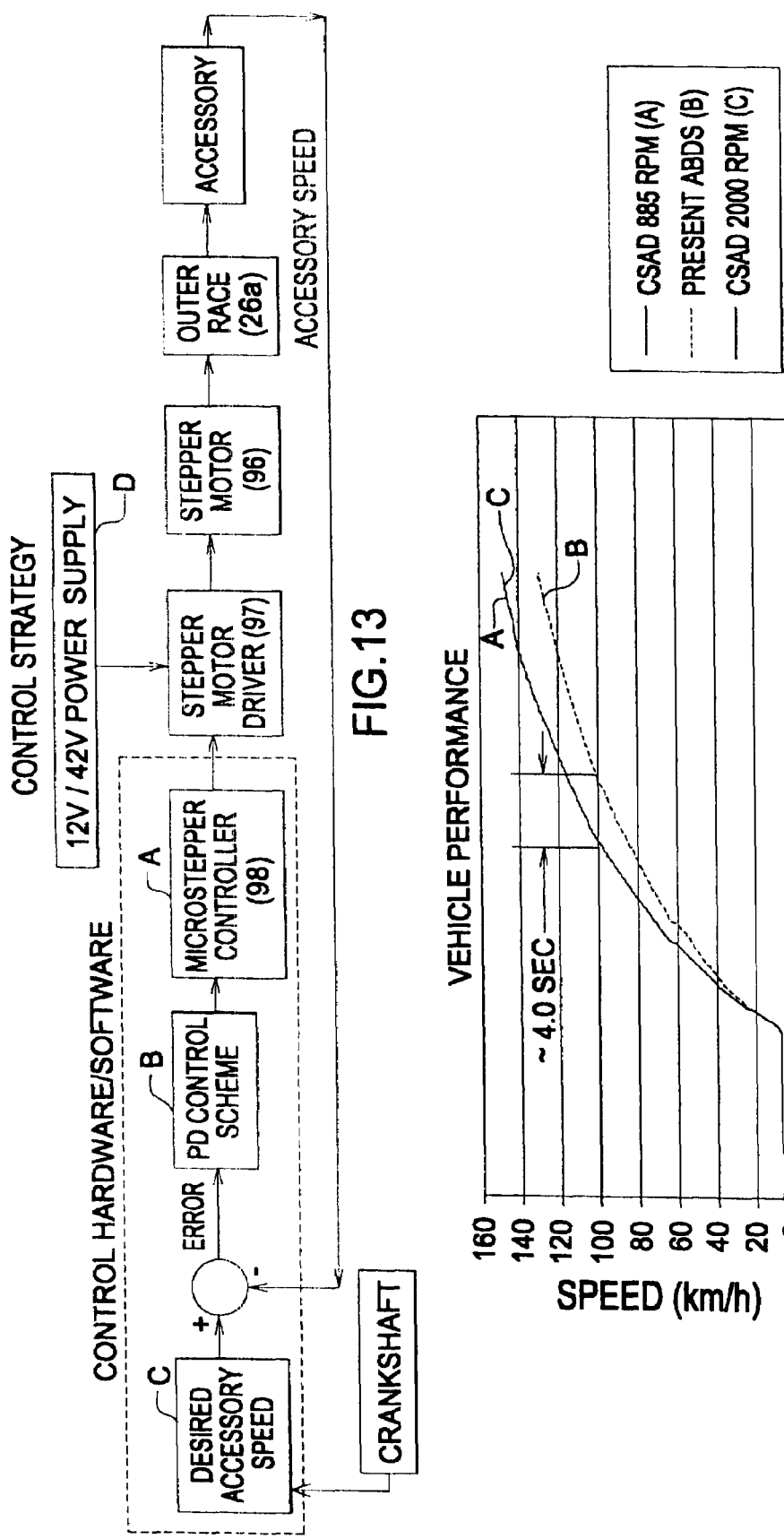
FIG. 13 is a block diagram of the control system.
FIG. 14 is a graph showing improved vehicle performance.

FIG. 13 is a block diagram of the control system. Control hardware and software comprise stepper motor controller microprocessor 98 (A) and the software resident in the microprocessor memory. The software resident in the microprocessor memory comprises a proportional-differential (PD) control scheme (B). Also stored in the memory for use by the software is a desired accessory speed (C). Microprocessor 98 receives signals from a crankshaft speed sensor and an accessory speed sensor.

The proportional-differential control implements an effective and simple control strategy. The software calculates an error between a desired accessory speed (C) and an actual accessory speed (obtained by a feedback loop). It takes the calculated error between the desired accessory speed and the actual speed and scales it with a proportional constant and a differential constant. If there is a difference between the desired accessory speed and actual accessory speed, an error signal is generated and transmitted to the stepper motor driver 97 that causes the stepper motor 96 to adjust the transmission ratio to cause the accessory speed to more closely match the desired speed. When the actual accessory speed becomes equal to the desired accessory speed no error signal will be present and the stepper motor is deactivated. As described elsewhere, the self-locking worm gear drive and outer race prevents the transmission from changing ratio while the stepper motor is deactivated. The stepper motor can be driven by a 12V or 42 V system (D).

Description of System Performance

Using vehicle simulation software, for example, GT-Drive™ from Gamma Technologies, Inc., it is possible to quantify the benefits of the inventive CSAD system. The following exemplary discussion relates to simulating the performance of a Ford Focus™ with a 2.0 L engine and a five speed manual transmission.

Figure 19:
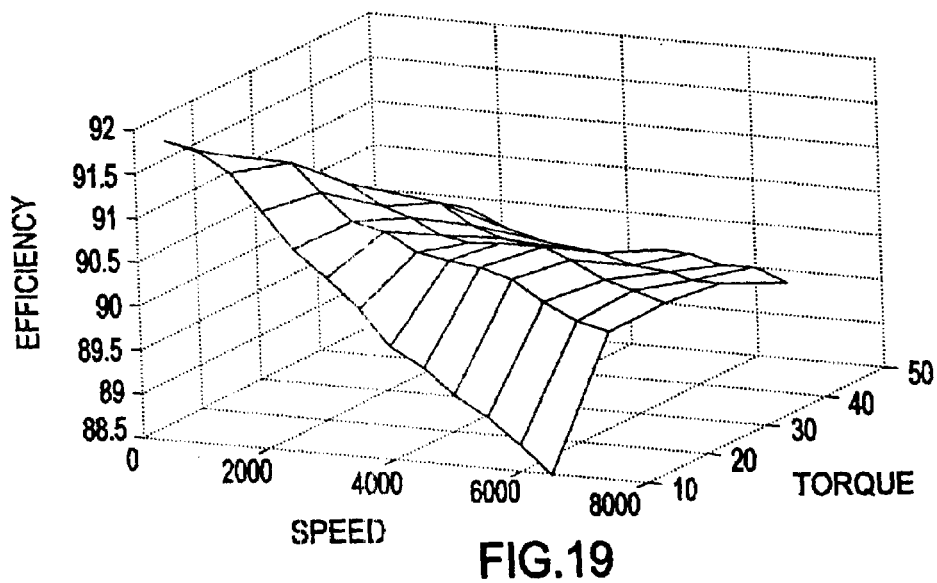
FIG. 19 is a map of the transmission efficiency.

A map of the transmission efficiency is set forth in FIG. 19. Efficiency is in %, speed is in RPM's and torque is in N/m.

The significantly improved acceleration performance of the vehicle using the inventive system is shown in FIG. 14. FIG. 14 depicts vehicle acceleration performance differences between two example accessory speeds. Curve (B) depicts the performance of a prior art engine using a prior art asynchronous belt drive system (ABDS). In the prior art system the accessory drive speed is directly proportional to the speed of the engine crankshaft since the accessories are directly coupled to the crankshaft by a single belt. By comparison, when the transmission output pulley 101 is operated at a constant speed of approximately 885 RPM (Curve (A)) using the inventive system, an approximate 4.0 second improvement in the 0-60 MPH acceleration time is realized. 885 RPM is the engine idle speed where the alternator generates approximately 70% of its rated current. When the accessories are operated at a constant speed of 2000 RPM (Curve (C)), the minimum speed where the alternator generates approxillidLely 100% of its rated current, the elapsed 0-60 time improvement is just slightly less than approximately 4.0 seconds. In either case (A or C) operating the accessories at a constant speed at or less than the speed of the engine crankshaft significantly improves vehicle performance by providing additional torque to the drive axle that would otherwise be used driving the accessories.

Figure 15:
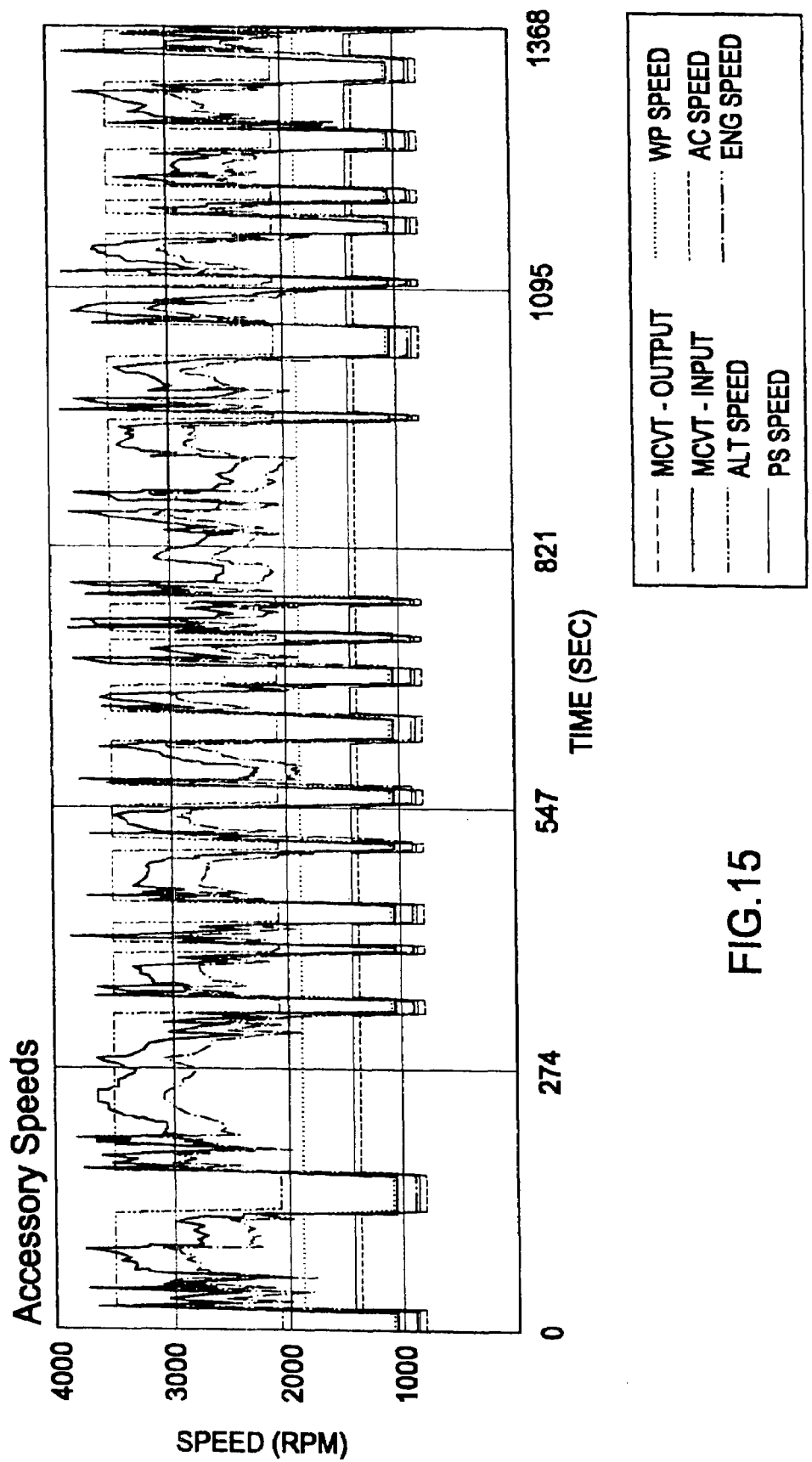
FIG. 15 is a graph showing accessory speeds compared to a crankshaft speed.

FIG. 15 is a graph which shows that although the engine speed continuously varies as the transmission shifts gears, the speed of the accessories remains substantially constant using the inventive CSAD system. Namely, the speed of shafts 22 and 102 is substantially constant over the operating speed range of the crankshaft for essentially two engine operating conditions, namely, comprising speeds in excess of idle, and, the engine speed at idle. The power steering pump (PS), air conditioner (AC) compressor, alternator (ALT) and water pump (WP) all operate at substantially constant speeds for each of the two operating conditions, although the alternator speed is relatively higher than the speed of the other accessories. The speeds illustrated in FIG. 15 are only provided as an example of relative operational characteristics of drive components and not as limiting accessory speeds for a system.

Figure 16:
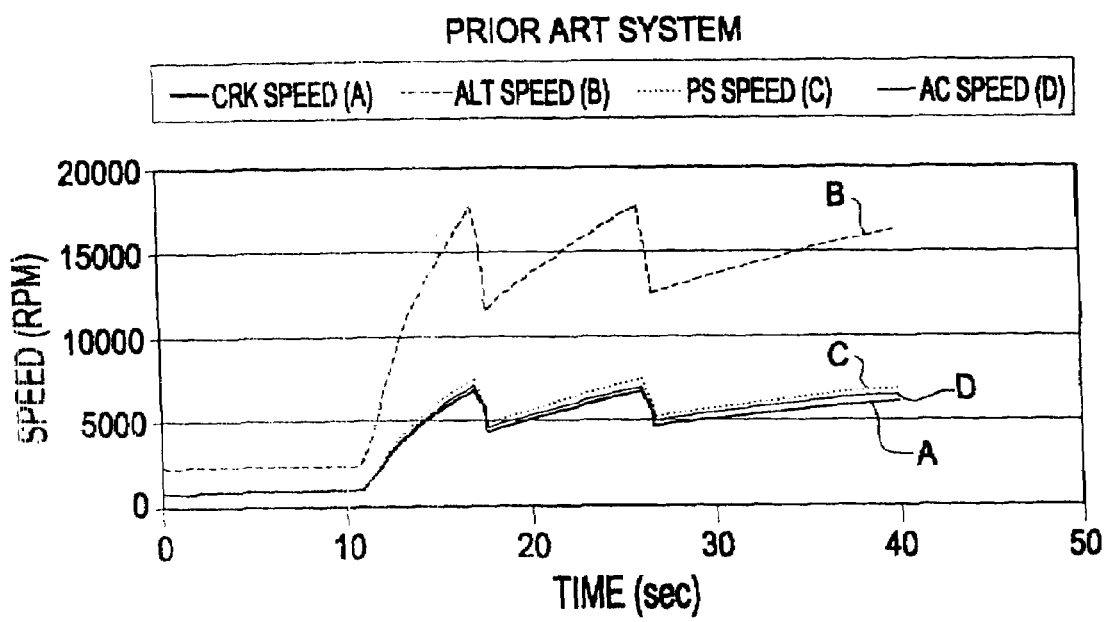
FIG. 16 is a graph showing accessory speed compared to crankshaft speeds for a proportionally driven prior art system.

Contrasting the inventive system with the prior art, FIG. 16 shows the speed behavior of a prior art system with a fixed ratio accessory drive connection to the crankshaft. The speed of the accessories (B), (C), and (D) is directly proportional to the speed of the crankshaft (A) since the accessory drive is directly coupled to the crankshaft by a belt. This prior art form of operation is inefficient since each accessory must be able to operate satisfactorily over the broad speed range presented by the crankshaft.

Figure 17:
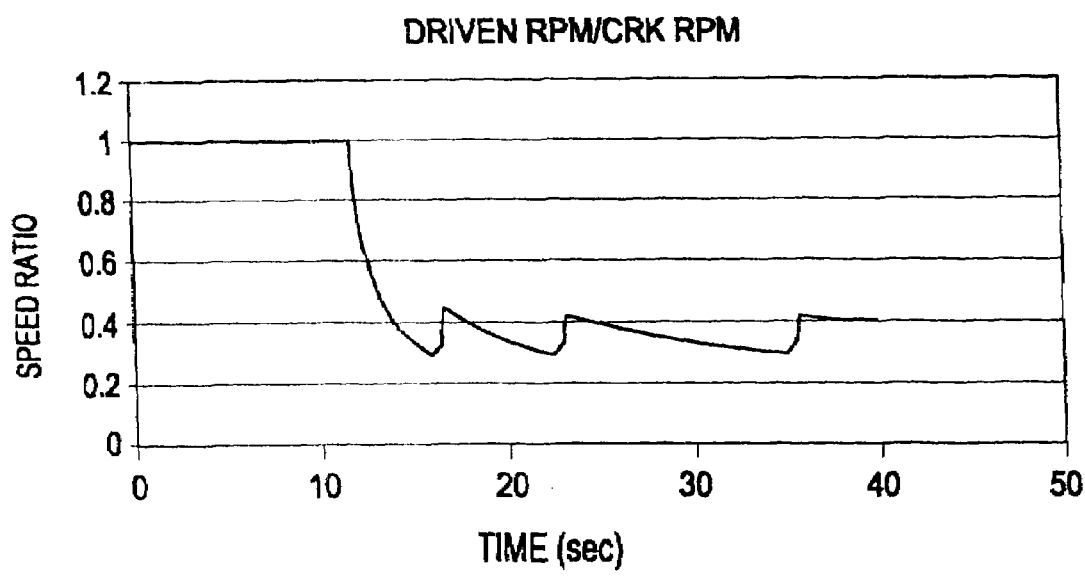
FIG. 17 is a graph showing speed ratios for the transmission.

FIG. 17 depicts an exemplary gear ratio variation for the transmission to maintain a constant speed behavior of the accessory drive.

Figure 20:
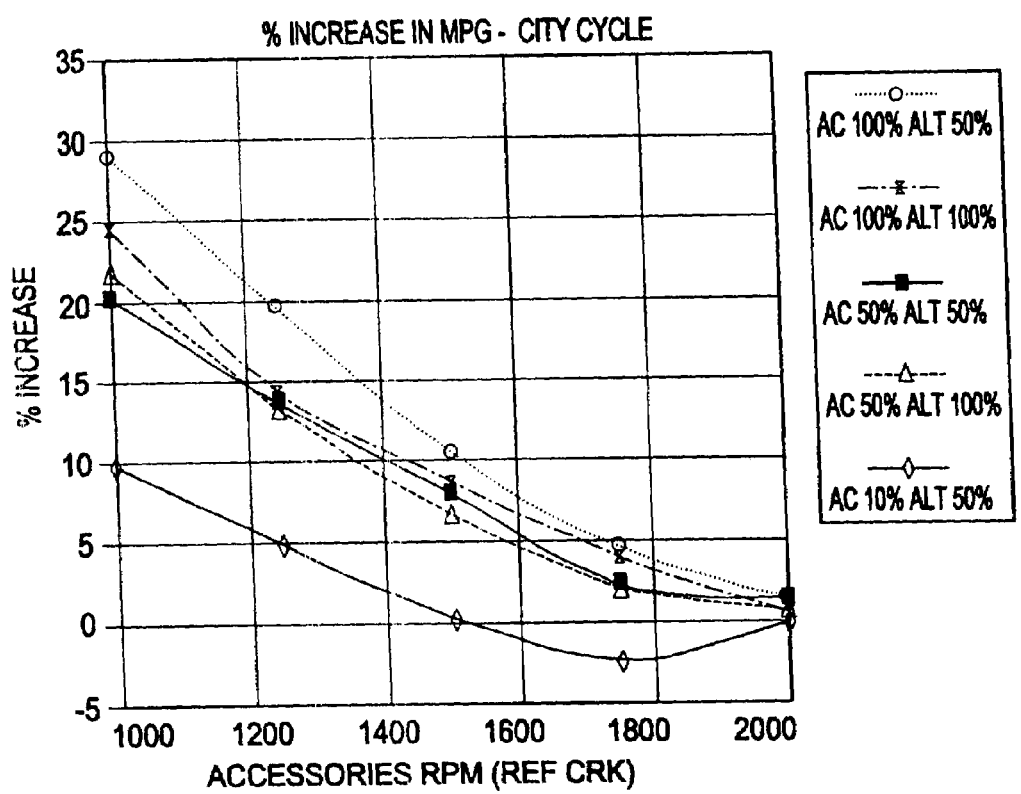
FIG. 20 is a graph depicting fuel efficiency.
Figure 21:
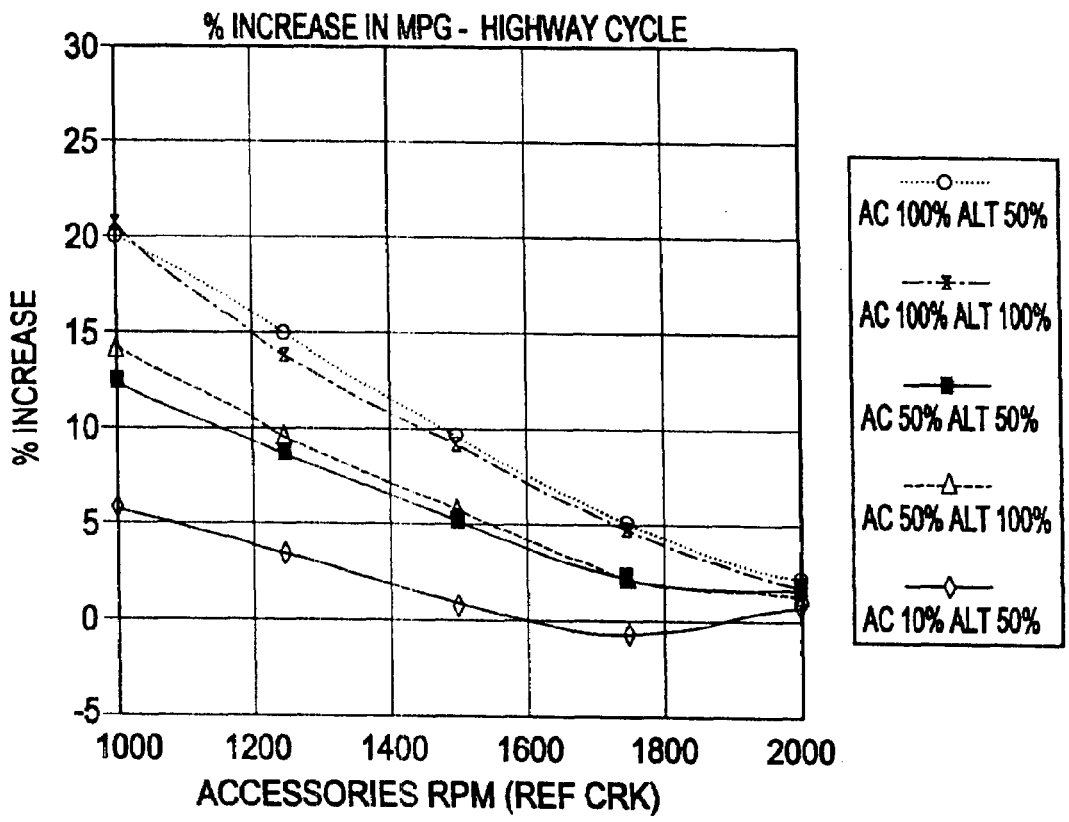
FIG. 21 is a graph depicting fuel efficiency.

Exemplary fuel efficiency improvements are shown for other accessory speeds are shown in FIGS. 20 and 21.

The "%" values indicate the percentage of time the AC (air conditioner) and Alt (alternator) are in operation. For example, one can see that for the city cycle at 1400 RPM with the AC 100% and Alt 100%, the % increase in MPG is approximately 11%. Likewise for highway cycle, the % increase is approximately 11%.

Figure 22:
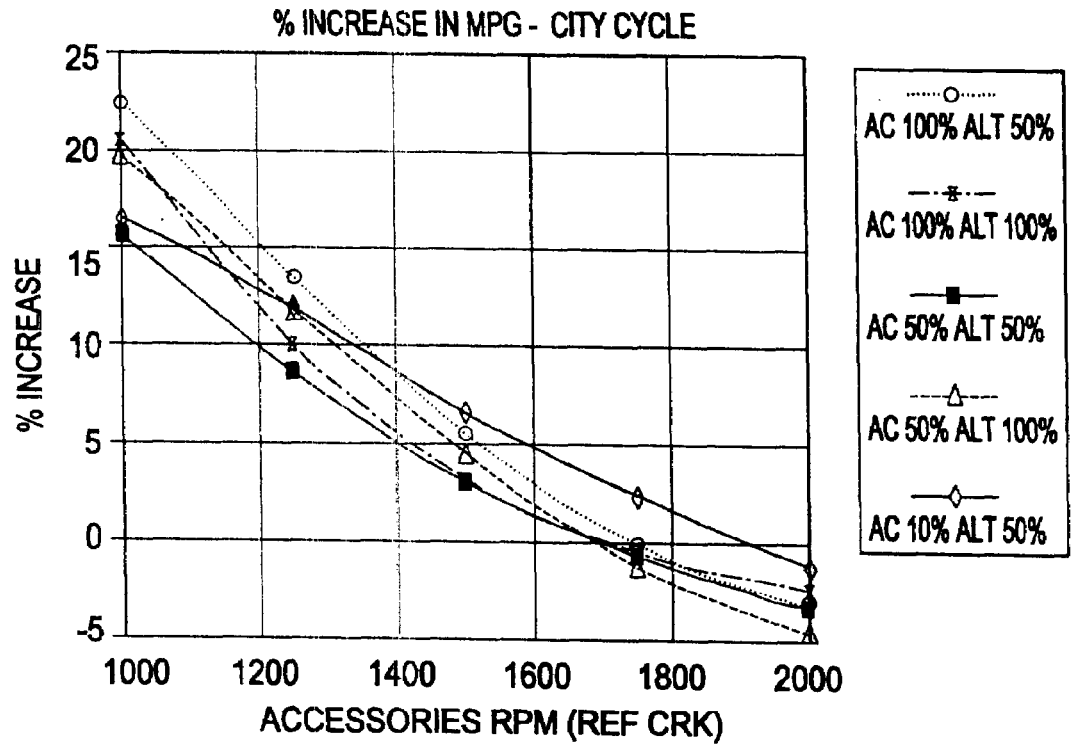
FIG. 22 is a graph depicting fuel efficiency.
Figure 23:
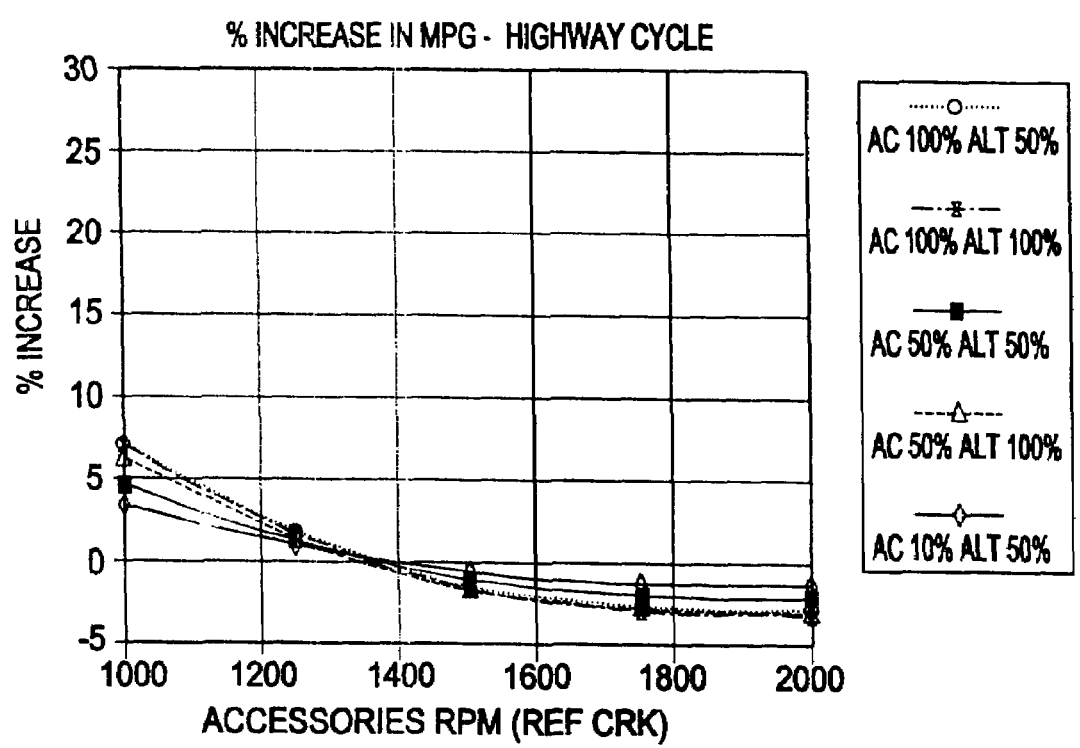
FIG. 23 is a graph depicting fuel efficiency.

The described analysis was also performed on a 5.3 L SUV engine with the results shown in FIGS. 22 and 23.

Figure 18:
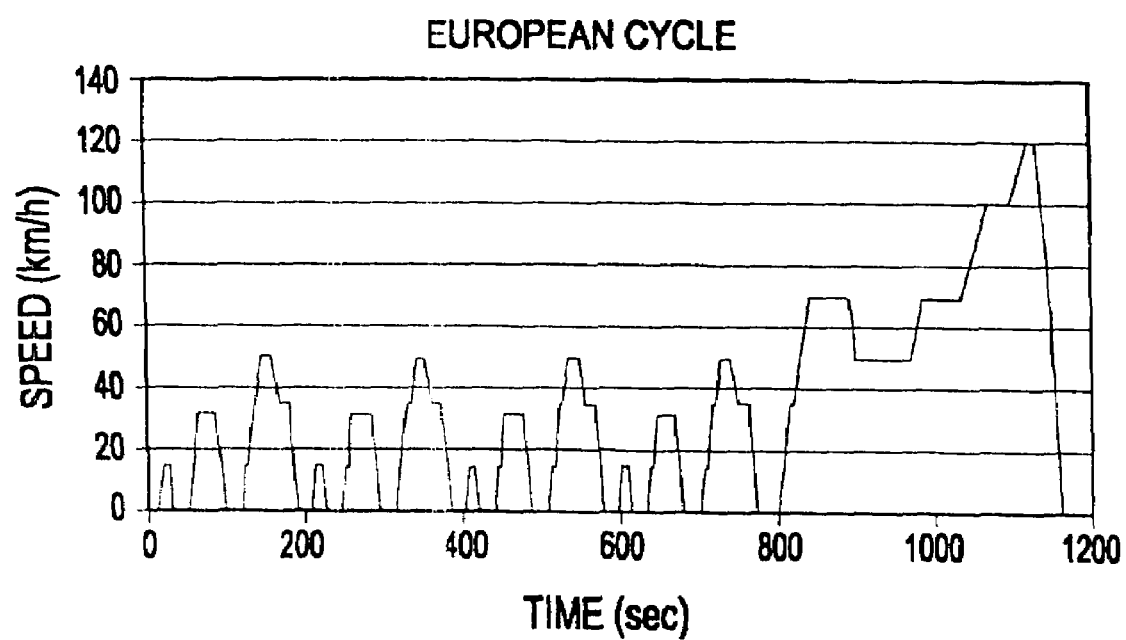
FIG. 18 is a graph showing an exemplary European drive cycle.

Table 1, below, illustrates the expected improvement in fuel economy for the European drive cycle shown in FIG. 18 for the 2.0 liter engine. Table 1 takes into account the torque transmitting efficiency of the transmission which is estimated at approximately 90%. However, the efficiency of the transmission need only be above approximately 85% in order to realize the estimated fuel savings if the accessory speed is controlled to approximately 2000 RPM. The alternator is continuously operated at approximately 5000 RPM+ to realize maximum efficiency. The system can tolerate a lower transmission efficiency (<85%) if the accessory speed is set to approximately 850 RPM. The improvement of the inventive system over the prior art system is illustrated in Table 2.

TABLE 1

Fuel Economy for Different CSAD Efficiencies over European Cycle

|  | 100% Efficiency | 95% Efficiency | 90% Efficiency | 85% Efficiency |
| --- | --- | --- | --- | --- |
| CSAD at 850 RPM | 31.2 mpg | 30.9 mpg | 30.5 mpg | 30.1 mpg |
| CSAD at 2000 RPM | 28.6 mpg | 28.5 mpg | 28.1 mpg | 27.6 mpg |
| Present System | 27.4 mpg | 27.4 mpg | 27.4 mpg | 27.4 mpg |

TABLE 2

Improvements of CSAD System over Present Fixed Ratio System

|  | 100% Efficiency | 95% Efficiency | 90% Efficiency | 85% Efficiency |
| --- | --- | --- | --- | --- |
| CSAD at 850 RPM | +13.9% | +12.8% | +11.3% | +9.6% |
| CSAD at 2000 RPM | +4.4% | +4.0% | +2.6% | +0.8% |
| Present System | — | — | — | — |

Further, under constant speed driving, such as that experienced on a highway, significant fuel savings are also realized as well. This is illustrated in Table 3 where the efficiency of the inventive CSAD transmission is assumed to be approximately 85%. Of course, as efficiency varies so does the fuel savings at constant speed.

TABLE 3

Fuel Savings at Constant Vehicle Speed

|  | 80 km/hr | 100 km/hr | 120 km/hr |
| --- | --- | --- | --- |
| CSAD at 850 RPM | +17.4% | +11.2% | +12.8% |
| CSAD at 2000 RPM | +6.4% | +2.9% | +6.4% |
| Present System | — | — | — |

Since the accessories are driven at a substantially constant speed, accessories such as the air conditioner compressor and alternator can be designed to be the most efficient at the chosen constant speed rather that being designed to have good performance over the entire engine crankshaft speed range. Further, parasitic losses of a hydraulic power steering unit can be minimized with the inventive system over the prior art by operating it at a lower speed.

Although forms of the invention have been described herein, it will be obvious to those skilled in the art that variations may be made in the construction and relation of parts without departing from the spirit and scope of the invention described herein.

We claim:

1. A method of operating a belt drive accessory system comprising the steps of:
transmitting a torque with a first endless member from a driver member to a planetary ball transmission input;

transmitting a torque by a second endless member from the planetary ball transmission output to a driven accessory;

selecting a speed ratio of the planetary ball transmission according to a driver member rotational speed;

calculating an error between a desired driven accessory speed and an actual driven accessory speed;

adjusting the speed ratio until no substantial error is generated; and locking the speed ratio of the planetary ball transmission when the driver member speed is constant.

2. The method as in claim 1 comprising the step of connecting a driven member directly to a planetary ball transmission second output.

3. The method as in claim 1 comprising the step of tensioning the second endless member with a tensioner.

4. The method as in claim 3 comprising the step of damping an oscillation of the second endless member.

5. The method as in claim 1 comprising the step of tensioning the first endless drive member with a tensioning member.

6. The method as in claim 1 comprising the step of damping an oscillation of the first endless member.

7. The method as in claim 1 comprising the step of a one-way clutching action for a driven accessory overrunning condition.

* * * * *